United States Patent [19]

Kruklitis et al.

[11] 3,987,411

[45] Oct. 19, 1976

[54] CHARACTER RECOGNITION SYSTEM EMPLOYING EXTRANEOUS AND REQUIRED PEAK DETECTION WITH VARIABLE THRESHOLD CONTROLLED TIMING

[75] Inventors: Karlis Kruklitis, Plymouth; Christopher J. Ratkowski, Dearborn; Steven C. Hickman, Inkster, all of Mich.

[73] Assignee: Burroughs Corporation, Detroit, Mich.

[22] Filed: Aug. 11, 1975

[21] Appl. No.: 603,592

[52] U.S. Cl. ............... 340/146.3 C; 340/146.3 AQ
[51] Int. Cl.[2] .......................................... G06K 9/13
[58] Field of Search ........... 340/146.3 C, 146.3 MA, 340/146.3 Z, 146.3 R, 146.3 Q, 146.3 AQ

[56] References Cited
UNITED STATES PATENTS

| | | |
|---|---|---|
| 3,103,646 | 9/1963 | Sheaffer, Jr. et al. ......... 340/146.3 C |
| 3,221,303 | 11/1965 | Bradley ....................... 340/146.3 C |
| 3,638,238 | 1/1972 | Milford et al. ................ 340/146.3 C |
| 3,868,635 | 2/1975 | Shah et al. .................... 340/146.3 C |

*Primary Examiner*—Leo H. Boudreau
*Attorney, Agent, or Firm*—Ronald L. Taylor; Leon E. Redman; Carl Fissell, Jr.

[57] ABSTRACT

A character recognition system utilizing precisely designed correlation network to match the voltage waveform of a character being read with the closest ideal waveform in a standard character font along with an extraneous peak detector that determines whether extraneous peaks are present in the voltage waveform and a required peak detector that determines whether a predetermined pattern of required peaks are missing from the voltage waveform for that voltage waveform to have been induced by the printed character with which it was preliminarily identified, under the control of a variable threshold controlled timing circuit for an extended dynamic range of voltage waveforms.

9 Claims, 44 Drawing Figures

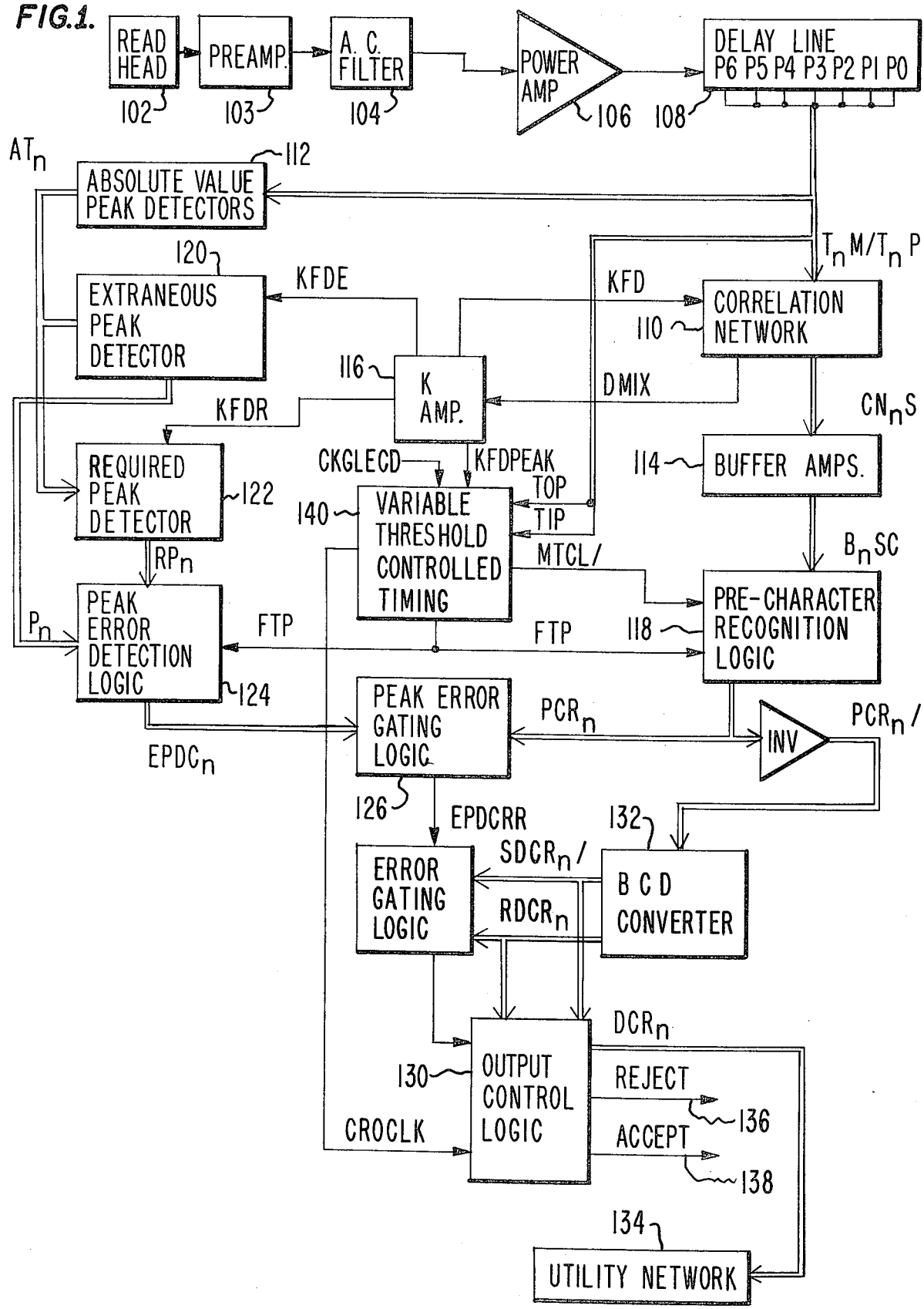

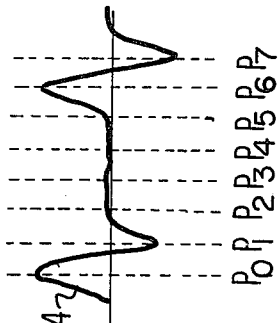
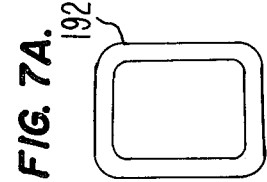
FIG. 6A.
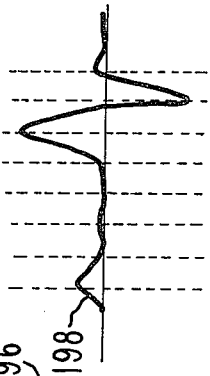
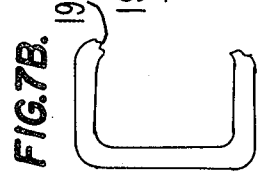
FIG. 6B.
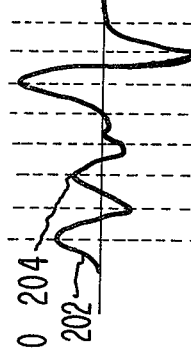
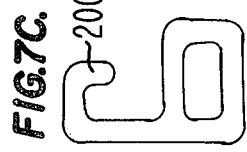
FIG. 6C.
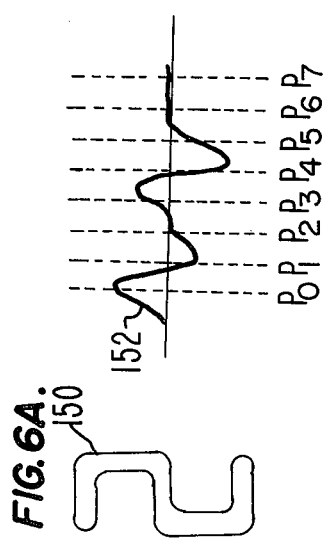
FIG. 7A.
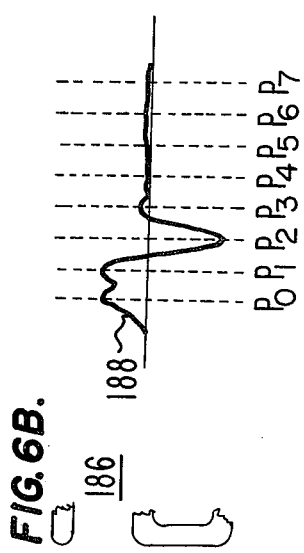
FIG. 7B.
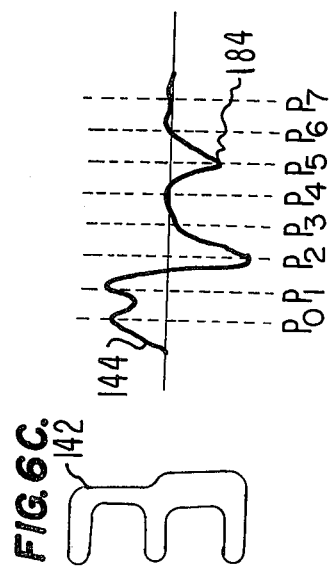
FIG. 7C.

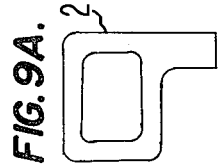
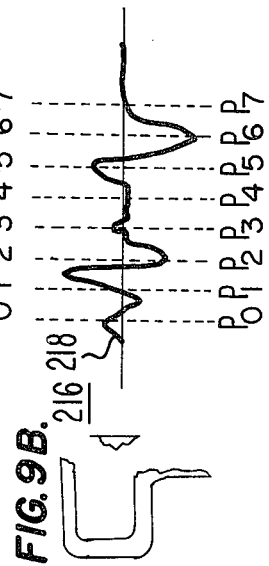
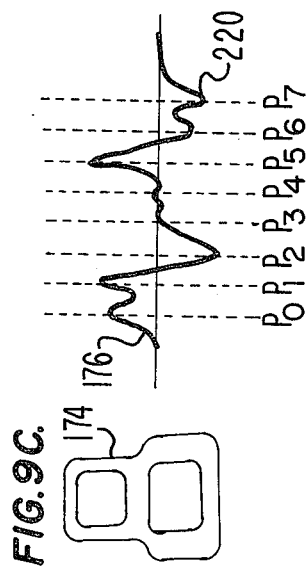
FIG.9A.  FIG.9B.  FIG.9C.
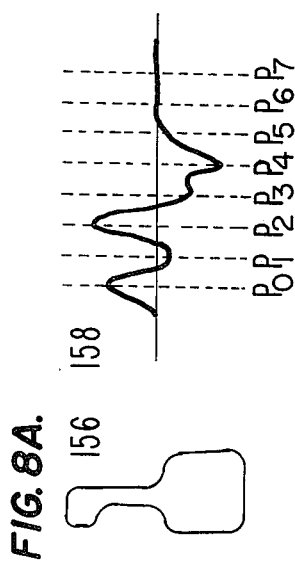
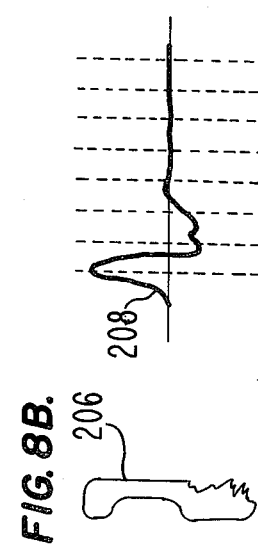
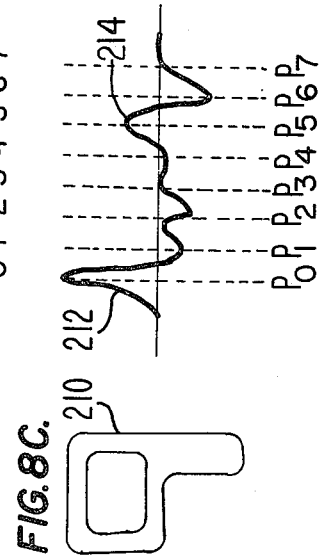
FIG.8A.  FIG.8B.  FIG.8C.

VARIABLE THRESHOLD CONTROLLED TIMING.

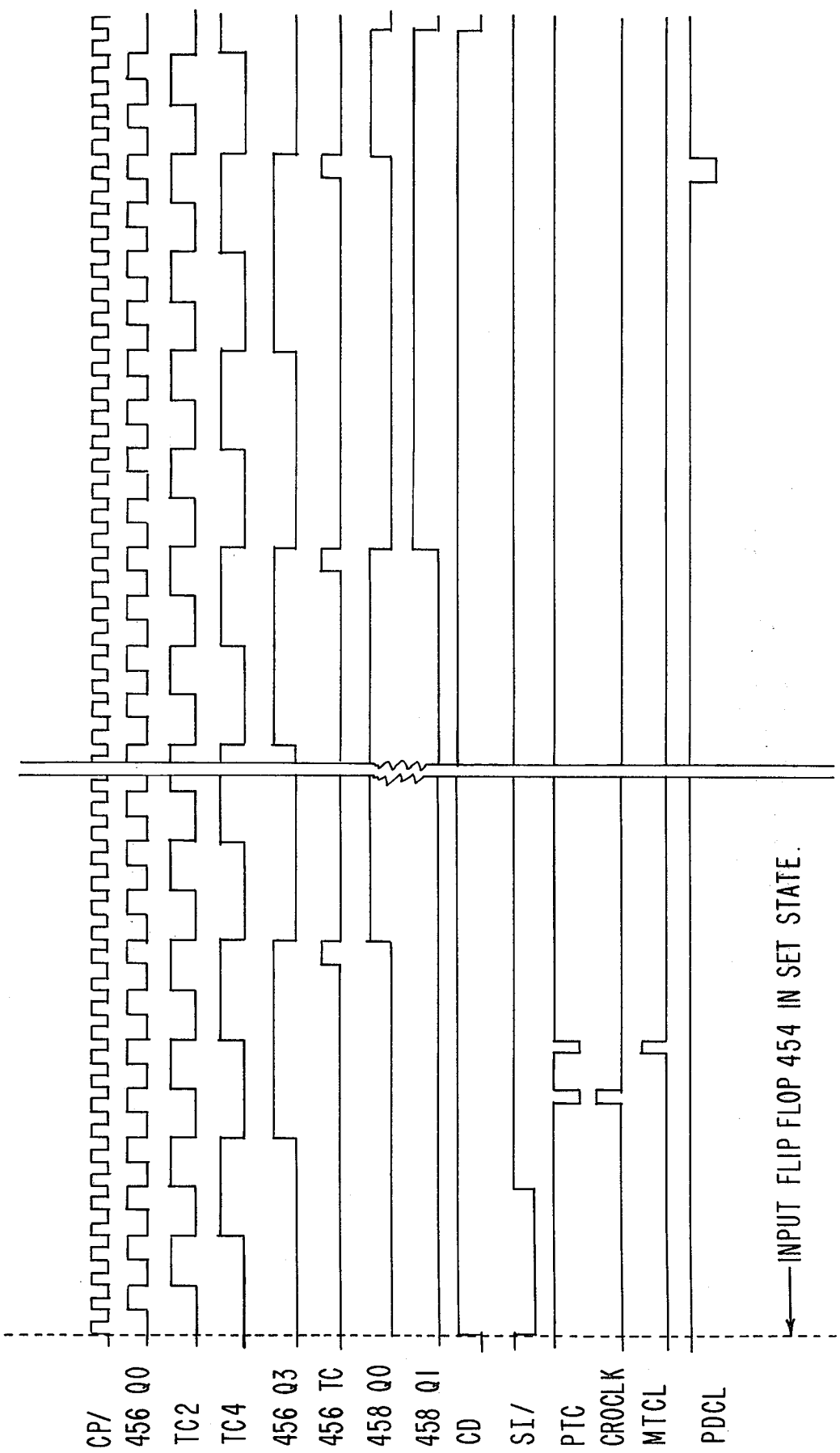

CHARACTER RECOGNITION SYSTEM EMPLOYING EXTRANEOUS AND REQUIRED PEAK DETECTION WITH VARIABLE THRESHOLD CONTROLLED TIMING

BACKGROUND OF THE INVENTION

This invention relates to character recognition systems. Such systems sense symbols printed in a predetermined type of font and analyze electrical waveforms generated from the sensed symbols. In this analysis certain characteristics of the generated electrical waveforms are compared with prescribed characteristics of predetermined waveform patterns uniquely associated with individual characters in the type font. A characteristic of the electrical waveform generated for comparison with a predetermined ideal waveform may be spacially separated voltage peaks.

1. Field of the Invention

In the art of magnetic ink character recognition, characters or symbols which are to be recognized as unique characters of a given type font are printed on a document with magnetizable ink. This document, upon which the symbols are printed, is transported past a magnetizing station where the magnetizable ink is subjected to a magnetic field which magnetizes the ink in accordance with the unique geometry of the imprinted symbols. The symbols, having thus been magnetized, are each characterized by their own magnetic field which provides a basis for recognizing or reading them in a magnetic ink character recognition system.

2. Description of the Prior Art

Prior art magnetic ink character recognition systems such as disclosed in U.S. Pat. No. 3,103,646 issued to I. M. Sheafer et al, and U.S. Pat. No. 3,221,303 issued to R. W. Bradley, both of common ownership herewith, employ an electromagnetic transducer reading head having a single transverse gap which intercepts the magnetic fields of D.C. magnetized symbols of a standard font as they are moved in sequence past the reading head for producing a unique characteristic voltage waveform for each of the magnetized symbols. A particular symbol will provide greater or lesser amounts of magnetic flux in accordance with its particular shape as the quantity of flux is directly proportional to the ink area which has been magnetized. Therefore, each of the characters in the type font produces a distant voltage signal at the output of the transducer proportional to the time rate of change of flux according to their respective shapes. Such flux changes determine the polarity, spacing and amplitude of voltage signal peaks. This varying signal output from the transducer, after proper amplification and low pass filtering, is fed to a delay line which has eight taps or sample points which enable the symbol and its associated voltage waveform to be time divided into seven sections along the direction of document transport. Thus the leading edge is represented by the voltage signal at the first tap of the delay line while the trailing edge of the printed symbol is represented by the voltage signal at either the last tap, or some tap between the first and the last if the symbol is relatively narrow in width. Thus, when a character or symbol has been completely transported past a transducer head, a voltage value appears at each tap of the delay line which, if plotted graphically, would represent the characteristic voltage waveform for the symbol being read.

These voltage signals appearing at the taps of the delay line may be passed to a plurality of correlation networks, with each network associated with a unique symbol of the type font to be read. If a particular symbol is being read, then its associated correlation network will provide the highest voltage output relative to the other correlation networks of the system. This is accomplished by selectively choosing the taps of the delay line to be fed to the individual correlation networks and by providing different predetermined valued resistors to collectively represent the ideal waveform of the symbol associated with a particular correlation network.

In general, error in character recognition systems refers to undesirable correlation of a voltage waveform stored in the delay line with an ideal voltage waveform representing a character other than the character being read. This type of error may be conveniently referred to as a character misread. Misreads occur in magnetic ink character recognition systems that employ correlation techniques due to a combination of various factors. The prior art character recognition disclosed in the above-mentioned U.S. Pat. No. 3,221,303 issued to R. W. Bradley, employs an unexpected peak detector to effectively prevent misreading poorly imprinted symbols having extraneous magnetic material. However, it has been recently discovered that certain other imprinting faults result in character misreads that cannot be prevented by an unexpected peak detector alone.

A symbol imprinted on the document may be distorted such that portions of the symbol of character within the symbol outline are not covered with magnetic ink. Such a distortion may occur due to imperfections of the printing devices employed to imprint a character on a document. Also, the pigment of the magnetic ink used by the printing devices may not have been uniformly dispursed throughout the character outline. Such poorly defined or misprinted characters produce voltage waveforms that more nearly resemble the ideal waveform of a character other than the character that was attempted to be printed, thereby causing a misread.

Besides the possibility of poor definition of characters on a document due to faulty printing techniques, there are inherent limitations in the use of correlation techniques in character recognition systems. For example, there are unavoidable hardware component tolerances in the delay line utilized to store the representation of the voltage waveform that prevents the sampling of the stored information at the optimum time. Large variations of character line width when considered with the wide range of signal voltage levels that must be sensed further prohibit the optimum sampling of the voltage waveforms. Furthermore, there are insertion losses with frequency variations in the delay line that further degrade the performance of the character recognition system.

In spite of all the above listed limitations in a character recognition system employing correlation techniques, it is imperative that the system determines the occurrence of a poorly printed character being incorrectly read as some other character and provides an alarm or reject signal in response to which the document would be specially handled.

SUMMARY OF THE INVENTION

It is an object of this invention to prevent the misreading of poorly defined characters in a character recognition system.

It is a further object of this invention to prevent misreads of poorly imprinted characters in a character recognition system employing correlation techniques.

It is a still further object of this invention to prevent such misreads irrespective the cause of the misread while maximizing the number of documents that may be processed through a character recognition system.

As a still further object of this invention, to prevent character misreads while minimizing the number of rejected documents requiring special handling.

In achieving the above mentioned objects, the character recognition system of the present invention reliably recognizes voltage waveforms induced by characters imprinted on a document as being acceptably correlated with a unique ideal waveform from a standard waveform font, and rejecting voltage waveforms generated by symbols with printing imperfections, by sampling the induced voltage waveform for peak errors caused by either the presence of extraneous peaks or the absence of a predetermined pattern of required peaks at an optimum sample time provided by a variable threshold controlled timing circuit.

BRIEF DESCRIPTION OF THE DRAWING

The foregoing and various other objects, advantages and meritorious features of the present invention will be apparent from the following detailed description and appended claims when read in conjunction with the drawing, wherein like numerals identify corresponding elements:

FIG. 1 is a block diagram of a character recognition system employing the present invention;

FIGS. 2 through 10 illustrate the type of voltage waveform misreads caused by poorly imprinted characters that the present invention prevents, with FIGS. 2A through 10A each illustrating a character that was attempted to be imprinted on a document, along with its associated standard waveform; FIGS. 2B through 10B illustrate various distortions of the characters of respective FIGS. 2A through 10A and the voltage waveforms they induce; FIGS. 2C through 10C illustrate the character and associated standard voltage waveform that the voltage waveform for the distorted character of respective FIGS. 2B through 10B would be misread as, without the present invention;

FIG. 23 is a timing diagram of various digital signals generated for data sampling and blank-out timing during the operation of the logic of FIGS. 1, 20 and 21.

DETAILED DESCRIPTION OF THE PREFERRED EMBODIMENT

Figure 2A:
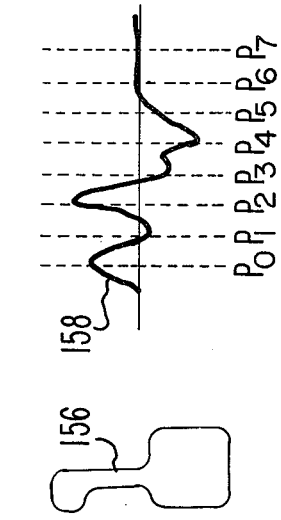
Figure 2B:
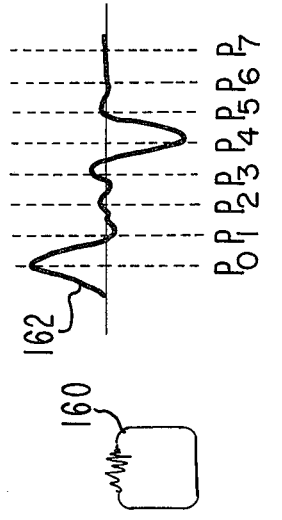

The character recognition system as seen in FIG. 1 is employed to substantially improve the performance of character recognition systems employed to distinguish MICR characters comprising a font of unique symbols. For example, a standard set of characters has been adopted by the American Banking Association for representation of characters and their uniquely associated waveforms which are designated as an E13-B font. The symbols in this font are both optically readable and magnetically distinguishable. Some of the numeric characters of this standard E13-B font are shown in FIGS. 2 through 10 along with their individually associated waveforms.

In the character recognition system of the present invention an electromagnetic transducer having a single transverse slit or gap read head 102 senses the magnetic flux of a character moved relative thereto along a single track and produces in serial fashion an analog voltage waveform representative of the character being recognized. This analog voltage waveform is then fed to a pre-amplifier 103 whose output may be filtered by an AC filter 104. The analog voltage waveform output from the AC filter 104 is then further amplified by a power amplifier 106 and in turn fed to the input of an analog storage device 108 which may comprise a tapped, balanced, dual-polarity delay line.

The structure and operation of such a dual polarity delay line 108 is disclosed in U.S. Pat. Nos. 3,103,646 and 3,221,303 incorporated by reference herein. The dual polarity delay line 108 is a network of identical L-C T's connected in series. Each of the L-C T's has the same characteristic time constant which corresponds to the nominal distance between peaks of a standard set of voltage waveforms. Each L-C T provides both a negative value and a positive value of the amplified induced voltage signal amplitude at a particular time. The induced analog waveform enters the delay line 108 in a serial fashion at a first pair of taps, whose output may be conveniently designated $T_7P/T_7M$, and continuously travels down the entire length of the delay line 108 toward the last pair of taps whose output is designated $T_0P/T_0M$. Each of the sampling tap pairs $T_nM/T_nP$ of the delay line 108 may be alternately referred to as one of the corresponding sample points $P_n$ of the voltage waveforms in FIGS. 2 through 10. The delay line 108 stores on each tap a voltage signal whose amplitude corresponds to the amplitude of the induced analog voltage waveform appearing thereat.

Throughout this specification, peak refers to a non-zero amplitude signal at a given sampling point $P_n$. A peak error refers to a missing or extraneous peak at a sample point on an induced voltage waveform pattern corresponding to the standard E13-B MICR character waveform with which it is correlated. The $T_nM/T_nP$ output from the delay line is fed to a correlation network 110 and also to a circuit of absolute value peak detectors 112.

The correlation network 110 determines which standard voltage waveform most closely approximates the induced voltage waveform appearing on the taps of the delay line 108. One of a plurality of correlation network output signals, designated $CN_nS$ is transmitted from the correlation network 110 to an individually associated buffer amplifier of a buffer amp circuit 114. This $CN_nS$ correlation network output signal, representative of a correlated character, is degeneratively fed back via the buffer amp circuit 114 and a K amp circuit 116 as a signal, designated KFD, to the correlation network 110. This KFD degenerative feedback assists in insuring that only one output of the correlation network occurs for the best possible fit of the induced voltage waveform in the delay line 108. For a more detailed description of the operation of the buffer amp circuit 114 and the degenerative feedback from the K amp circuit 116, reference should be made to U.S. Pat. No. 3,103,646 which is incorporated by reference herein. The output of the buffer amps 114, which may be conveniently designated as $B_nSC$, is transmitted to a pre-character recognition logic circuit 118 which provides a $PCR_n$/ pre-character recognition signal in binary format for comparison with the results of extraneous and required peak detection.

The absolute valve peak detectors 112 determine the location of peaks on the induced voltage waveform appearing on the taps of the delay line 108. The results of this peak detection is output as $AT_n$ absolute value tap signals to an extraneous peak detector circuit 120 and a required peak detector circuit 122. The extraneous peak detector 120 compares each of the $AT_n$ absolute value tap signals with a reference voltage signal, designated KFDE, developed in the K amps 116 as a function of the degenerative feedback signal designated KFD, fed back to the correlation network 110. For each $AT_n$ absolute value tap signal that is greater than the KFDE reference signal, a corresponding $P_n$ digital signal, representative of a sampled peak, is output from the extraneous peak detector 120 to the error detection logic 124. Similarly, certain of the $AT_n$ detected peak signals from the peak detectors 112 are transmitted to the required peak detector circuit 122. For each of the $AT_n$ detected peak signals that is greater than a second reference voltage signal, designated KFDR, also developed from the KFD feedback signal in the K amps 116, a corresponding digital required peak signal $RP_n$ is output from the required peak detector circuit 122. The error detection logic circuit 124 receives the $P_n$ digital peak signals from the extraneous peak detector 120 along with the $RP_n$ digital required peak signals output from the required peak detector 122 to determine whether a combination of missing required peaks or extraneous peaks for any of the problem characters that may be read by the recognition system has been detected. An $EPDC_n$ error peak detected character signal appears for each such possible error combination.

The $EPDC_n$ error peak detected character signals are transmitted to the peak error gating logic 126 along with $PCR_n$ digital output signals from the pre-character recognition system representing the particular character that has been preliminarily recognized. The peak error gating logic 126 then compares the combination of detected missing required peaks and extraneous peaks with each associated pre-character recognition $PCR_n$ digital signal to determine whether a peak error has occurred for the character that has been preliminarily recognized in the system. If such a misread has indeed occurred in the system, the peak error gating logic 126 will output an error peak detected character recognized reject signal, designated EPDCRR, to error gating logic 128. In response to an EDPCRR error signal, the error gating logic 128 will in turn cause a REJECT signal to be output from output control logic 130. If no such misread has occurred, then the output control logic 130 will output to a utility network 134, a binary coded decimal representation of the recognized character via a BCD converter 132. In such a case there will be no REJECT signal on output line 136. If desired, the output control logic 130 may also provide an ACCEPT readout signal on output line 138 indicating that a character has been reliably recognized without a misread occurring.

A variable threshold controlled timing circuit 140 is employed to simultaneously strobe both the error detection logic 124 and the pre-character recognition logic 118 at an optimum time when the best match is made between the waveform on the delay line 108 and the standard waveform for the character that is being recognized and subsequently enable the output control logic 130.

REQUIRED PEAK DETECTION

A key feature of the present invention is the required peak detector 122 that determines whether certain required peaks are missing from an induced voltage waveform in the delay line 108 to indicate that a misread condition may be present. It has been discovered that certain distorted or poorly imprinted MICR characters generate associated induced voltage waveforms that are repeatedly confused with certain other character waveforms of a standard character and waveform font. It has been further discovered that by preventing the character recognition system from misreading these certain poorly imprinted and distorted MICR characters that the overall performance of the character recognition system could be significantly improved with both a higher reliability document throughput and at the same time a lower misread rate. The distorted MICR characters that were found to cause a statistically significant percentage of system misreads prior to the present invention are illustrated along with their uniquely associated induced voltage waveforms in FIGS. 2 through 10. FIGS. 2A through 10A illustrate the character that was attempted to be imprinted on the document along with the ideal E13-B standard waveform associated with that character. FIGS. 2B through 10B illustrate how the characters shown in FIGS. 2A through 10A may have been distorted by faulty imprinting or otherwise, and the resulting induced voltage waveform. FIGS. 2C through 10C illustrate the characters and associated standard voltage waveforms that a character recognition system would mistakenly correlate as the characters that should be recognized from the voltage waveforms induced by the distorted characters in FIGS. 2B through 10B without the present invention.

For example, in FIG. 2A, a proper character 3 symbol 142 was intended to be the symbol imprinted on the document. However, a distorted character 3 symbol 146 resulted. The standard voltage waveform 144 associated with a character 3 symbol 142 has peaks at sample points $P_1$, $P_2$ and $P_5$. It should be noted that the ideal E13-B standard voltage waveform 144 for the character 3 does not include a peak on sample point $P_3$. When a character 3 has been distorted such as that illustrated by symbol 146 in FIG. 2B, a voltage waveform 148 is induced. The voltage waveform 148 induced by the distorted character 146 has peaks on sample points $P_1$ and $P_4$ but not on sample point $P_3$. When this induced voltage waveform 148 is seated in the delay line 108 at the time that the waveform is sampled, the correlation network 110 will determine, as is explained hereinafter, that the best match with a standard E13-B voltage waveform is standard voltage waveform 152 representative of symbol 150 which is a character 2. However, it should be noted that the standard E13-B waveform 152 for the symbol 150 includes a peak 154 at sample point $P_3$. A system misread of a distorted character 3 symbol 146 (FIG. 2B) for a character 2 symbol 150 (FIG. 2C) may be avoided in the present invention by requiring a voltage waveform which is correlated with the standard voltage waveform 152 uniquely associated with a symbol 150 to have a peak 154 on sample point $P_3$ before it is determined that the character 2 has been reliably recognized.

Figure 3A:
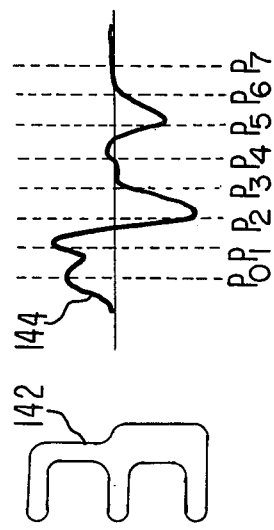
Figure 3B:
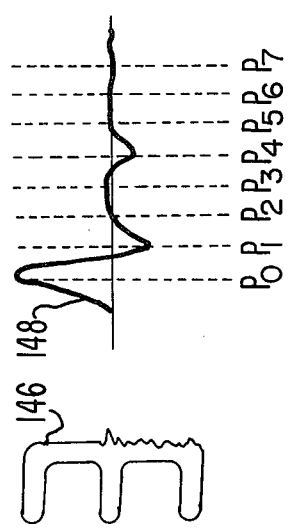
Figure 3C:
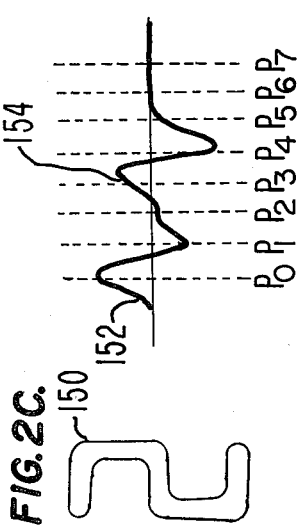

Referring to FIG. 3A, a proper character 1 symbol 156 is shown with its uniquely associated standard voltage waveform 158. In FIGS. 3B and 3C, it can be seen that the misreading of a voltage waveform 162 induced by a distorted character 1 symbol 160 (FIG. 3B) as a standard character 2 symbol 150, may be prevented by requiring every induced voltage waveform correlated with the standard waveform 152 associated with a character 2 symbol 150 (FIG. 3C) to have a peak 164 at sample point $P_1$.

Figure 4A:
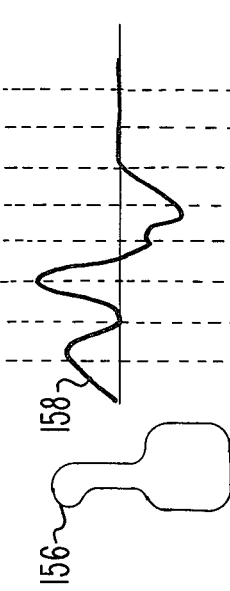
Figure 4B:
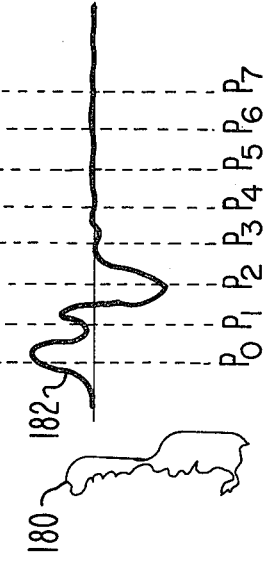
Figure 4C:
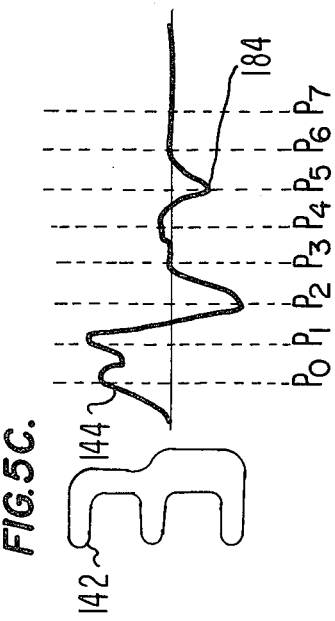

A correctly encoded character 5 symbol 166 is shown in FIG. 4A along with its uniquely associated standard voltage waveform 168 that does not include a peak at sample point $P_7$. FIGS. 4B and 4C illustrate that the misreading of voltage waveform 172 induced by a distorted character 5 symbol 170 (FIG. 4B) as the standard voltage waveform 176 for a character 8 symbol 174 (FIG. 4C) may be prevented by requiring an induced voltage waveform correlated with standard voltage waveform 176 to peak 178 at sample point $P_7$ that is missing from the induced waveform 172.

Figure 5A:
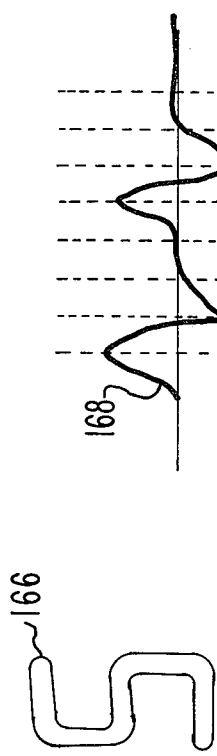
Figure 5B:
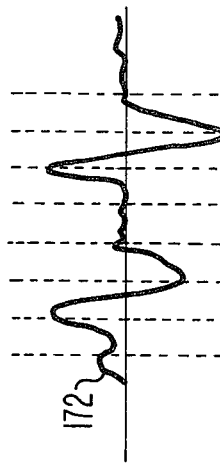
Figure 5C:
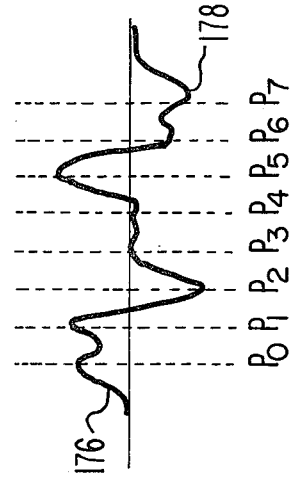

FIGS. 5A through 5C illustrates that the misreading of a voltage waveform 182 induced by a distorted character 1 symbol 180 (FIG. 5B) as a standard waveform 144 for a character 3 symbol 142 may be prevented by requiring a voltage waveform correlated with a standard waveform 144 to have a peak 184 on sample point $P_5$ that is not present on distorted waveform 182. By requiring a voltage waveform that is preliminarily recognized by the character recognition system as a standard voltage waveform 144 (FIG. 6C) to have this peak 184 at sample point $P_5$, the misreading of a voltage waveform 188 induced from a distorted character 2 symbol 186 (FIG. 6B) as the standard voltage waveform 144 for a character 3 symbol 142 may also be prevented.

Referring now to FIG. 7A, a proper character 0 symbol 192 along with its uniquely associated standard voltage waveform 194 is illustrated. The misreading of a voltage waveform 198 (FIG. 7B) induced by a distorted character 0 symbol 196 as the standard waveform 202 (FIG. 7C) of a character 6 symbol 200 may be prevented by requiring a voltage waveform preliminarily recognized as a standard voltage waveform 202 associated with a character 6 symbol 200 to have a peak 204 on sample point $P_2$.

Similarly, the misreading of a voltage waveform 208 induced by a distorted character 1 symbol 206 (FIG. 8B) as a character 9 symbol 210 (FIG. 8C) having associated standard voltage waveform 212 may be prevented by requiring a voltage waveform preliminarily recognized as a character 9 waveform 212 to have a peak 214 on sample point $P_5$.

Likewise, the misreading of a poorly defined character 9 symbol 216 that induces voltage waveform 218 (FIG. 9B) as a character 8 symbol 174 having associated standard waveform 176 may be prevented by requiring a peak 220 on sample point $P_7$ for an induced voltage waveform 176 correlated with a character 8 waveform 176 (FIG. 9C).

Figure 10A:
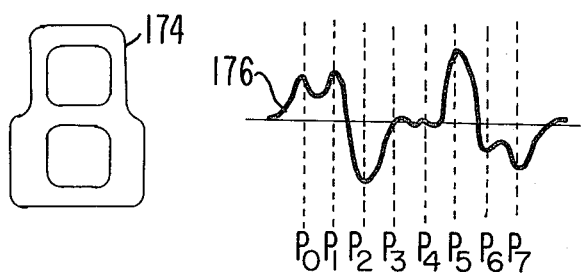
Figure 10B:
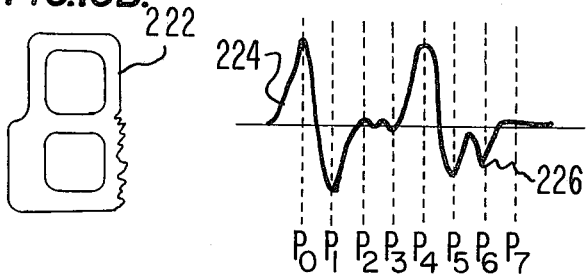
Figure 10C:
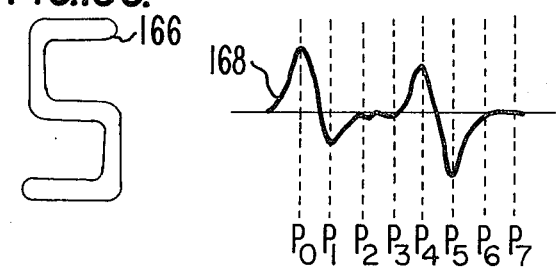

FIGS. 10A through 10C illustrate the type of misread that the extraneous peak detector 120 of the present invention can prevent. A character 8 symbol 174 has a voltage waveform 176 (FIG. 10A) associated therewith. A distorted symbol 222 (FIG. 10B), that was intended to be a character 8 symbol, induces a voltage waveform 224 that is more closely correlated with the standard voltage waveform 168 associated with a character 5 symbol 166 (FIG. 10C). It should be noted that the induced waveform 226 associated with the distorted symbol 176 includes a peak 226 at sample point $P_6$ that is not present in the standard voltage waveform 168 with which it was correlated. The extraneous peak detector 120 of the present invention detects the presence of this extraneous peak 226 for a distorted symbol 222 and prevents the character recognition system from misreading this waveform 226 induced by a distorted character 8 symbol 222 as the standard voltage waveform 168 for a character 5 symbol 166 (FIG. 10C).

Figure 11:
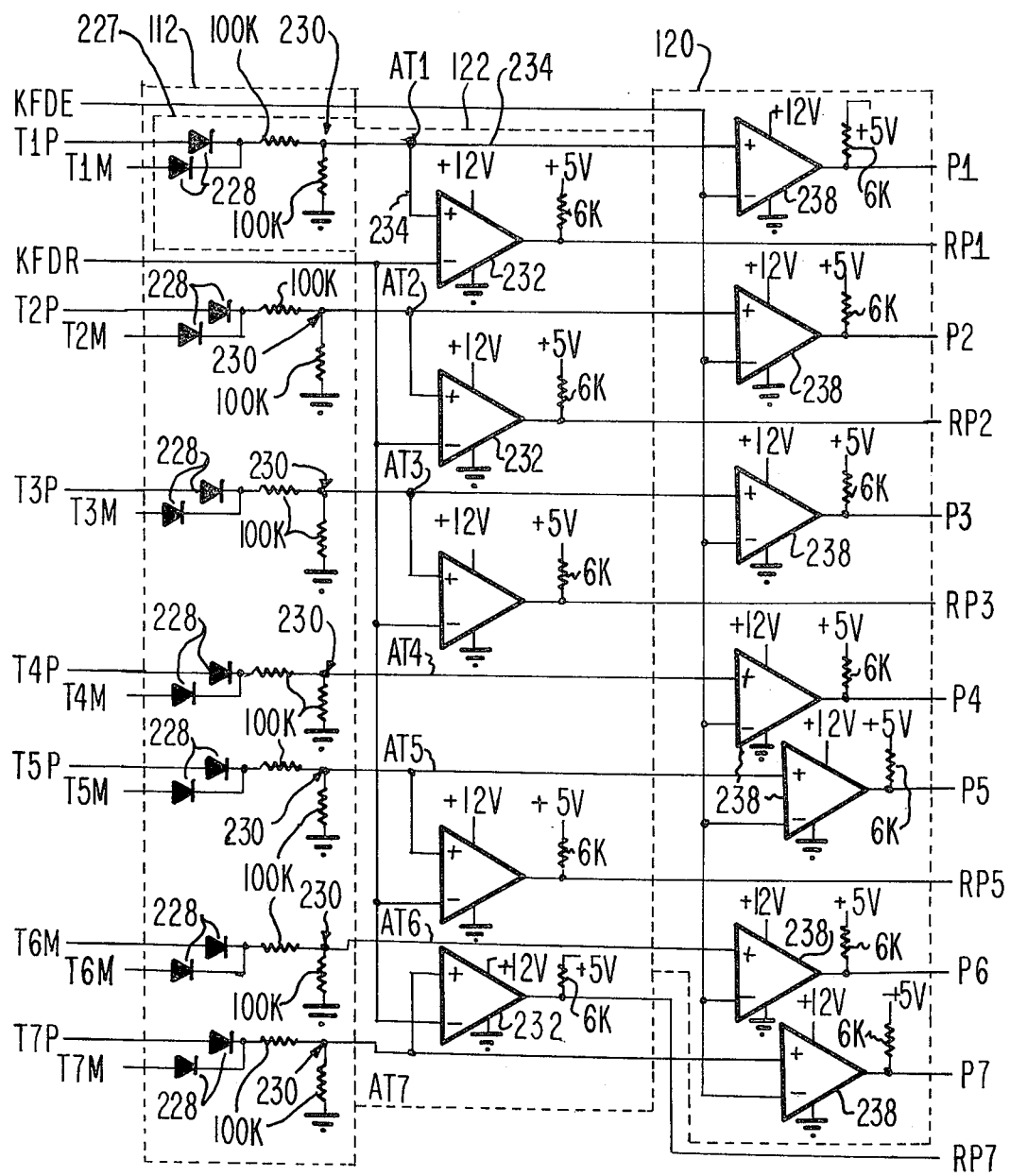
FIG. 11 is a schematic diagram of the absolute value peak detectors, extraneous peak detector and required peak detector of FIG. 1 employed for peak error detection.

The preferred embodiment of the required peak detector 122, as illustrated in FIG. 11, comprises a plurality of comparators 232. Each comparator 232 which may be a conventional LM339 comparator, of the required peak detector 122 receives on its positive input an $AT_n$ absolute value voltage signal from its individually associated absolute value peak detector 227. Each absolute value peak detector 227 comprises a pair of diodes 228 coupled at their common cathode to a voltage divider 230 formed by a pair of 100K ohm resistors. The absolute value peak detectors circuit 112 comprises an absolute value peak detector 227 for each associated tap $T_nP/T_nM$ of the dual polarity delay line 108 (FIG. 1). Since the delay line 108 is a dual polarity delay line, if a peak appears on either the negative ($m$) or the positive ($p$) side of a given $T_nP/T_n$ tap, then the other side of that tap will also have a peak but of the opposite polarity. For example, if a negative peak appears on tap T1P, then tap T1M will have a positive peak. Thus, the output of the voltage divider 230 in the absolute peak detectors 112 will be a positive $AT_n$ voltage signal for any non-zero voltage level appearing on its respective tap of the dual polarity delay line 108. This absolute peak voltage signal $AT_n$ is fed to the positive input of its associated comparator 232 of the required peak detector 122 via input line 234.

The negative input of each of the comparators 232 of the required peak detector 122 will receive via line 236 the KFDR analog voltage signal that is used as a reference for comparison with the $AT_n$ signals for determining the presence of a required peak at the predetermined taps that are being monitored for required peaks. This KFDR analog voltage signal is a variable threshold signal developed from the K amp circuit 116 (FIGS. 1, 16B and 19) as explained hereinafter. Thus, if the absolute value of the absolute peak voltage signal $AT_n$ output from a particular absolute peak detector 227 exceeds this KFDR variable threshold signal, then that comparator 232 will output a digital required peak $RP_n$ signal indicative of the presence of a required peak at that particular tap. It should be noted that the required peak detector circuit 122 does not monitor the absolute peak detector 112 for required peaks at sample points $P_4$ or $P_6$ because it has been discovered that these two particular sample points do not provide any additional criteria in preventing the types of misreads that a character recognition system employing an E13-B font experiences. If desired, it is obvious that these $P_4$ and $P_6$ sample points could similarly be monitored for required peaks.

The extraneous peak detector circuit 120 comprises a plurality of comparators 238 individually associated with each of the set of taps of the dual polarity delay line 108 via the absolute value peak detectors 112 in a manner similar to that of the required peak detector 122. However, there is a comparator 238 in the extraneous peak detector 120 associated with each of the seven tap sets that are being monitored. Each comparator 238 receives on its positive input via a line 234 the identical absolute peak $AT_n$ signal that is input to a corresponding comparator 232 of the required peak detector circuit 122 and in addition to $AT_n$ signals at sample points $P_4$ and $P_6$. Each comparator 238 of the extraneous peak detector 120 also receives on its negative input the KFDE variable analog voltage feedback signal via line 240. This KFDE feedback signal is developed from the KFD feedback signal output from the K amp 116 in a fashion similar to that of the KFDR signal provided to the required peak detectors 122. Thus, if the absolute value of the absolute peak voltage signal $AT_n$ output from a certain absolute peak detector 227 exceeds this KFDE reference signal, then that comparator 238 will output a digital $P_n$ peak signal indicative of the presence of a possible extraneous peak at that particular tap of the delay line 108.

It is an important feature of the present invention that the KFD feedback signal is employed as the basis for both the KFDR and KFDE threshold signals to the required peak detector 122 and extraneous peak detector 120, respectively. The KFD feedback signal from the K amplifier 116 is directly related to the signal level of the waveform stored in the dual polarity delay line 108. Thus, if a relatively low signal level waveform is stored in the delay line 108, then the KFDR and KFDE threshold signals for the required peak detector 122 and extraneous peak detector 120 will also be at relatively low threshold levels. Also, if a high signal level induced voltage waveform is present in the delay line 108, then the KFDR and KFDE threshold signals will be at relatively high threshold levels.

Another important feature of the extraneous and required peak detection of the present invention is that while the KFDR and KFDE threshold signals for the required peak detector 122 and the extraneous peak detector 120, respectively, are both divided down voltages of the KFD feedback signal from the K amplifier 116 and will both rise and fall in unison therewith, they are at relatively different levels from each other. A higher level threshold is employed for the extraneous peak detection than for required peak detection to maximize the contribution of the specific function that is performed by both the extraneous peak detector 120 and the function served by the required peak detector 122. The extraneous peak detector 120 is employed to monitor for such sources of character recognition error as extraneous ink spots, double character encoding, or extra quantities of magnetizable ink within an encoded character that would produce extraneous and undesirable peaks in the delay line that are not present in the E13-B ideal waveform of the character that is correlated with the waveform stored in the delay line 108. In contrast to this, the required peak detector 122 is monitoring the waveform in the delay line 108 for the absence of peaks that are required in the E13-B standard waveform for the particular character with which the induced waveform in the delay line is correlated. If the reference threshold for the required peak detection is the same as the relatively high reference employed for extraneous peak detection, a problem arises, namely, an inordinate number of character reject errors occur. The source of this problem of an unacceptably high number of character reject errors is the erroneous indication of an absence of certain required peaks that ordinarily have a relatively smaller amplitude than other peaks present in the character waveform. The solution to this problem is achieved by providing a lower threshold for the required peak detection than is provided for extraneous peak detection. By providing this difference in variable threshold between the extraneous peak detector 120 and the required peak detector 122, a maximum number of character misreads is prevented while the number of readable characters that are rejected is minimized.

In the preferred embodiment of the present invention, as explained hereinafter, the KFDR threshold signal input to the required peak detector 122 is provided at approximately 35% of the voltage level of the KFD feedback signal from the K amplifier 116; whereas the KFDE threshold voltage signal input to the extraneous peak detector 120 is approximately 50% of the voltage level of the KFD feedback signal. Therefore, in order for a digital required peak signal $RP_n$ to be generated from a comparator 232 of the required peak detector, the $AP_n$ absolute peak signal output from the absolute value peak detectors 112, representative of the absolute value of a peak voltage signal at that associated tap of the delay line 108, must exceed the KFDR variable threshold signal provided at the negative input of the comparator 232 by only approximately 35% of the KFD feedback signal from the K amplifier 116. On the other hand, that same $AP_n$ absolute peak signal provided to the positive input of a comparator 238 of the extraneous peak detector 120 must exceed the KFDE variable threshold signal input to the comparator 238 by approximately 50% of the KFD feedback signal. The comparator 238 will output a $P_n$ digital peak signal whenever the $AT_n$ absolute peak analog signal exceeds the KFDE threshold signal.

The digital required peak signals $RP_n$ are fed from the required peak detector circuit 122 along with the digital peak signals $P_n$ to the peak error detection logic circuit 124 (FIGS. 1, 12, 13 and 14). The peak error detection logic circuit 124 includes a plurality of gate inverters 243 employed to individually invert each of the digital peak signals $P_n$ to be ORed with certain required peak signals $RP_n$. This enables the peak error detection logic circuit 124 to determine whether certain $P_n$ peak signals are in a low logic state, indicative of the absence of extraneous peaks, while at the same time determining whether certain $RP_n$ required peak signals are in a high logic state, indicative of the presence of the predetermined required peaks for a given character.

The error detection logic circuit 124 (FIGS. 1, 12, 13 and 14) of the present invention includes logic means for detecting predetermined peak errors in character waveforms to minimize or eliminate misreading certain closely configured waveforms of a standard font. It is obvious to a person of ordinary skill in the art that the peak error detection logic means described below could be modified to distinguish other closely configured waveforms in any standard character font and is not limited to the E13-B standard font. An important feature of the present invention resides in the error detection logic circuit 124 implementing a solution to a statistically significant problem of confusing certain E13-B waveforms with other closely configured E13-B waveforms by monitoring for certain critical peak errors only for any possible problem character in the entire standard font.

The standard E13-B waveform 194 (FIG. 7A) for a character 0 symbol 112 includes voltage peaks at sample points $P_0$, $P_1$, $P_6$ and $P_7$. To insure that no extraneous peaks are present for a character 0 symbol 192 the error detection logic circuit 124 monitors digital peak signals P2, P3, P4 and P5 to make sure that all of these peak signals are in a low logic state. This is efficiently accomplished in the error detection logic circuit 124 of the present invention by providing as input to the negated inputs of NOR gate 241 (FIG. 12) the P2 and P5 peak signals after being inverted by associated inverter gates 243. If either the P2 or P5 digital peak signal is in a high logic state, indicating the presence of an extraneous peak at sample points $P_2$ or $P_5$, then the digital signal P25 output from the negated output of NOR gate 241 will be at a low logic state. A digital signal, designated as P34/ is obtained by inputting digital peak signals P3 and P4 to the two negated inputs of NOR gate 249 (FIG. 13) after having been individually inverted by associated inverter gates 243. The digital signal P34/ output from NOR gate 249 is inverted by the inverter gate 251 whose output is designated digital signal P34. If either peak signal P3 or P4 is at a high logic state, then digital signal P34 will be in a low logic state. The P25 digital signal is provided as an input to the negated input of NOR gate 242 along with the digital signal P34. Thus, if any of the P2, P3, P4 or P5 digital peak signals are in a high logic state, then the output of NOR gate 242 (FIG. 12) will also be in a high logic state. The output from NOR gate 242 is connected to the D input of D-type flip-flop 270. Therefore, with a high logic state output from NOR gate 242, the D-type flip-flop 270 will be set upon receipt at its C clock pulse input of the next FTP fine timing pulse, resulting in a high logic state EPDCO error peak detected signal for character 0 at its Q output. In order to keep the flip-flop 270 from outputting a high logic state EPDCO error peak signal, all four peak signals P2, P3, P4 and P5 must remain in a low logic state, which is the case when no extraneous peaks are present for a character 0 waveform. Required peak detection is unnecessary to reliably determine that a character 0 has been properly read in the preferred embodiment of the present invention.

The ideal E13-B waveform 15B associated with a character 1 symbol 156 (FIGS. 3A, 5A and 8A) has significant voltage peaks at sample points $P_2$, $P_3$ and $P_4$. There should be no voltage peaks at sample points $P_1$, $P_5$, $P_6$ or $P_7$. In determining whether this criteria is met, NOR gate 244 (FIG. 12) receives at its negated inputs peak signals P1 and P5 after having been inverted by respective inverter gates 243 along with a digital signal P67. Signal P67 is provided at the negated output of NOR gate 255 (FIG. 13) which receives at its two negated inputs digital peak signals P6 and P7 after having been inverted by their respective inverter gates 243. Therefore, if any of the P1, P5, P6 or P7 digital peak signals are in a high logic state, then a high logic state will occur at the output of NOR gate 244 causing its associated flip-flop 271 to become set upon the occurrence of the next FTP fine timing pulse. Setting flip-flop 271 in turn results in a high EPDC1 error peak signal at its Q output. Required peak detection need not be provided for character 1 identification in the preferred embodiment of the present invention.

Figure 2C:
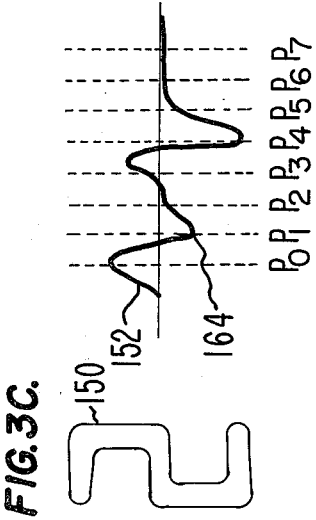

The standard E13-B voltage waveform 152 associated with a character 2 symbol 150 (FIGS. 2C, 3C and 6A) includes voltage peaks at sample points $P_0$, $P_1$, $P_3$ & $P_4$. There should be no voltage peaks present at sample points $P_2$, $P_5$, $P_6$ or $P_7$ for a proper character 2 voltge waveform 152. To monitor that extraneous peaks are not present in a voltage waveform for a charactoer 2 waveform 152 NOR gate 246 (FIG. 12) receives digital signals P25 and P67 at two of its negated inputs. Therefore, if any of the digital peak signals P2, P5, P6 or P7 are in a high logic state, then the output of NOR gate 246 will be in a high logic state causing its associated flip-flop 272 to become set and output a high logic state EPDC2 error peak signal from its Q output. It will also be remembered that requiring peaks at sample points $P_1$ and $P_3$ prevents misreading a distorted character 1 symbol 160 (FIG. 3B) or a distorted character 3 symbol 146 (FIG. 2B) as a character 2 symbol 150 (FIGS. 2C and 3C). To this end NOR gate 246 receives the digital required peak signals RP1 and RP3 at its other negated inputs. Therefore, if either RP1 or RP3 required peak signals are in a low logic state, indicating the absence of one of these required peaks, then the output of NOR gate 246 will be in a high logic state setting its associated flip-flop 272 which in turn produces an EPDC2 high logic state error peak signal. Thus it can be appreciated that both extraneous peak error and required peak error detection may be efficiently achieved to reliably recognize a character 2 voltage waveform 152 with the peak error detection logic circuit 124 of the present invention.

The standard E13-B voltage waveform 144 associated with a character 3 symbol 142 includes voltage peaks at sample points $P_1$, $P_2$ and $P_5$. There should be no extraneous peaks at sample points $P_3$, $P_4$, $P_6$ or $P_7$ for a character 3 waveform 144. Such extraneous peak detection is implemented by providing digital signals P34 and P67 to negated inputs of NOR gate 248. If any of the P3, P4, P6 or P7 digital peak signals are in a high logic state, the output of the NOR gate 248 will also be in a high logic state causing its associated flip-flop 273 to become set and provide a high logic state EPDC3 error peak detected for a character 3 signal to be output therefrom. It will also be remembered that requiring the presence of a peak at sample point $P_5$ for a character 3 waveform 144 prevents either a distorted character 1 symbol 156 (FIG. 5B) or a distorted character 2 symbol 186 (FIG. 6B) from being misread as a character 3 symbol 142. Implementing this misread prevention NOR gate 248 receives on an additional negated input the digital required peak signal RP5. If there is an absence of a peak signal at sample point $P_5$, then the RP5 digital required peak signal will be in a low logic state which would cause the output of NOR gate 248 to be in a high logic state setting its associated flip-flop 273, which would in turn output a high logic level EPDC3 error peak signal detected for a character 3.

Figure 13:
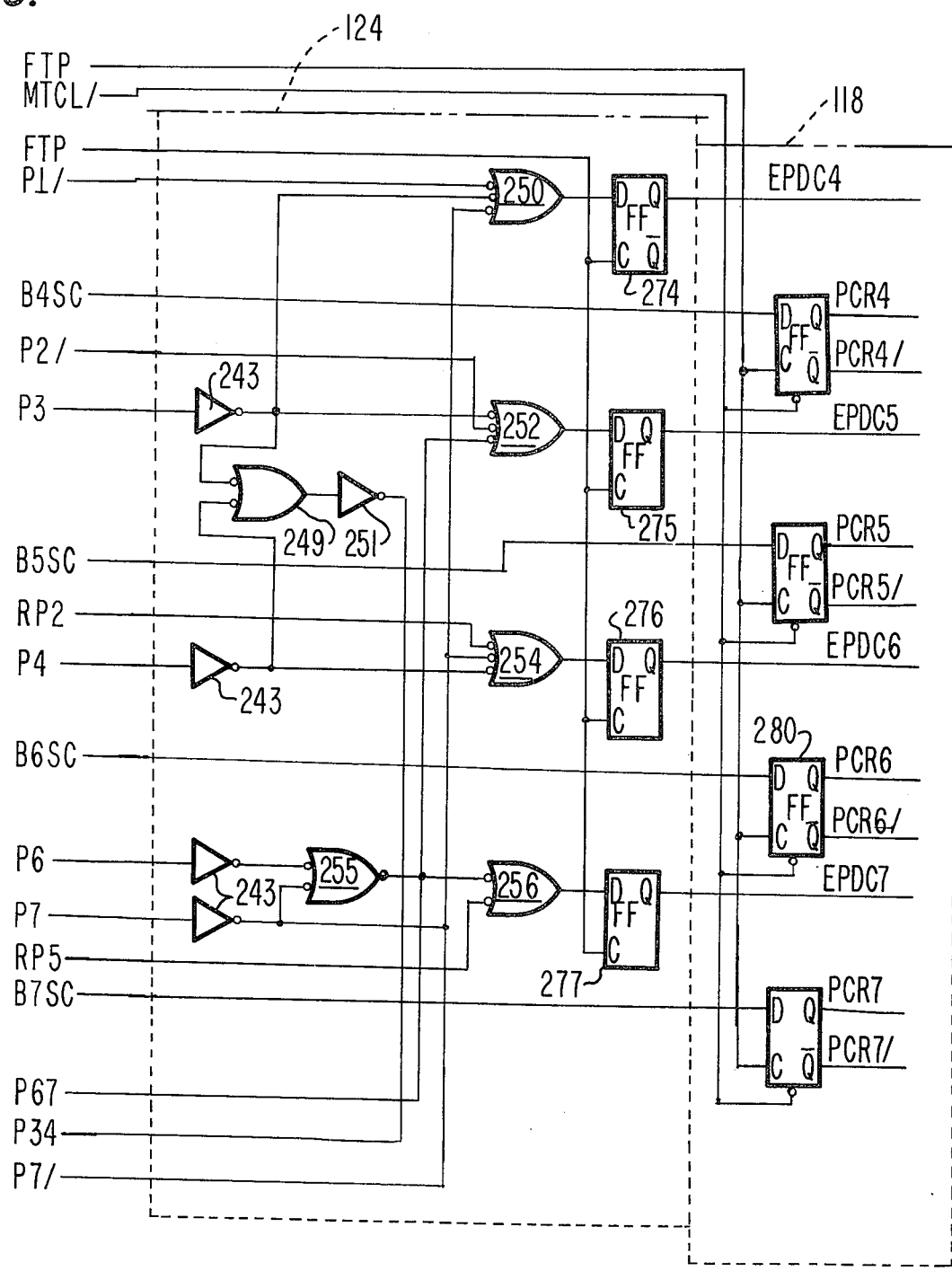
FIG. 13 is a logic diagram of an additional portion of the peak error detection logic and the precharacter recognition logic of FIG. 1.

Referring to FIG. 13, the peak error detection logic circuit 124 further includes a NOR gate 250 that causes its associated flip-flop 274 to become set if an extraneous peak is detected for a character 4 waveform (not shown) as indicated by the occurrence of a high logic state digital peak signal P1, P3 or P7. With flip-flop 274 in a set state, it outputs a high logic state EPDC4 extraneous peak signal detected for a character 4.

Extraneous peak error is determined for a character 5 waveform 166 by providing digital peak signals P2/, P3/, and P67 to the negated inputs of NOR gate 252 in order that its associated flip-flop 275 may become set upon the occurrence of a high logic condition at any one or more of these digital peak signals.

The standard E13-B voltage waveform 202 (FIG. 7C) associated with a character 6 symbol 200 includes voltage peaks at sample points $P_1$, $P_2$, $P_3$, $P_5$ and $P_6$ but no voltage peaks should appear at sample points $P_4$ or $P_7$. Therefore, an extraneous peak error should be indicated for a character 6 waveform 202 if a peak appears at either sample point $P_4$ or $P_7$. This is implemented by providing digital peak signals P4 and P7 after having been inverted by associated inverter gates 243 to negated inputs of NOR gate 254 (FIG. 13). If an extraneous peak appears at either sample points $P_4$ or $P_7$, the resulting high logic state digital peak signal P4 or P7 will be seen as a low logic state by NOR gate 254 causing its output to be in a high logic state and in turn resulting in its associated flip-flop 276 becoming set and outputting a high logic state EPDC6 error peak signal detected for a character 6. It should be remembered that requiring a peak to be present for a character 6 waveform at sample point $P_2$ prevents a distorted character 0 symbol 196 (FIG. 7B) from being misread as a character 6 symbol 200. In accomplishing this misread prevention, NOR gate 254 (FIG. 13) receives on an additional negated input, the digital required peak signal RP2. Therefore, if the required peak at sample point $P_2$ is absent from the induced voltage waveform, then a resulting low logic state RP2 digital required peak signal will cause the NOR gate 254 to output a high logic state signal which in turn sets its associated flip-flop 276 whose resulting high logic state output signal EPDC6 indicates an error peak detection for a character 6.

The standard E13-B waveform (not shown) associated with a character 7 includes voltage peaks at sample points $P_1$, $P_2$, $P_3$, $P_4$ and $P_5$. A character 7 waveform should have no voltage peaks present at sample points P6 or P7. Such extraneous peak error indication for a character 7 is implemented by providing digital signal P67 to a negated input of NOR gate 256. It should be remembered that if either digital peak signal P6 or P7 is a high logic state, representative of a voltage peak at either sample point $P_6$ or $P_7$ respectively, then digital signal P67 will be in a low logic state. Receipt of such a low logic state P67 digital signal by NOR gate 256 results in its output being in a high logic state which in turn causes its associated flip-flop 277 to become set. This results in a high logic state EPDC7 error peak detected signal for a character 7 at the Q output of flip-flop 277. Requiring a voltage peak to be present at sample point $P_5$ for a character 7 could prevent misreading some other poorly encoded character for a character 7. For example, a character 2 that has been poorly imprinted such that its lower left stroke is missing, would induce a voltage waveform that would be closely correlated with the ideal waveform for a character 7. However, such an induced voltage waveform for this poorly encoded character 2 would not have a voltage peak at sample point $P_5$. Such a misread may be prevented by providing an additional negated input of NOR gate 256 with digital required peak signal RP5. With no voltage peak present at sample point P5, digital required peak signal RP5 would be in a low logic state cuasing the output of NOR gate 256 to be in a high logic state. This high logic state results in its associated flip-flop 277 becoming set and outputting a high logic state EPDC7 error peak detected for a character 7 signal.

The standard E13-B voltage waveform 176 (FIGS. 4C and 9C) for a character 8 symbol 174 includes voltage peaks at sample points $P_0$, $P_1$, $P_2$, $P_5$, $P_6$ & $P_7$ with an absence of voltage peaks at sample points $P_3$ and $P_4$. To determine whether an extraneous peak or peaks are present for a character 8 waveform 176, NOR gate 258 (FIG. 14) receives at one of its negated inputs digital signal P34, which as is explained hereinbefore, represents the logic state of signals P3/ and P4/ functionally related in an ORed fashion. Thus, if either digital peak signal P3 or P4 is in a high logic state, representative of a voltage peak at respective sample points $P_3$ or $P_4$, then digital signal P34 will be in a low logic state cuasing the output of NOR gate 258 to be in a high logic state, which in turn results in its associated flip-flop 278 assuming a set state with a high logic level Q output signal EPCD8, error peak detected for a character 8. It will be remembered that requiring a voltage peak at sample point $P_7$ for a character 8 prevents either a distored character 5 symbol 170 (FIG. 4B) or a distorted character 9 symbol 216 (FIG. 9B) from being misread as a character 8 symbol 174. To implement this misread prevention, NOR gate 258 receives at its other negated input digital required peak signal RP7. Therefore, if digital required peak signal RP7 is in a low logic state, indicative of the absence of a required peak at sample point $P_7$, then the output of NOR gate 258 will assume a high logic state causing its associated flip-flop 278 to assume the set state and output the error peak detected for character 8 EPDC8 signal.

A character 9 symbol 210 (FIG. 8C) has an associated E13-B voltage waveform 212 that includes voltage peaks at sample points $P_1$, $P_2$, $P_5$ and $P_6$ with an absence of voltage peaks at sample points $P_3$, $P_4$ and $P_7$. The occurrence of an extraneous peak at any one or more of the sample points $P_3$, $P_4$ or $P_7$ is indicated by respective digital peak signals P3, P4 or P7. To determine whether or not such an extraneous peak error for a character 9 has occurred, NOR gate 260 receives on one of its negated inputs the digital signal P34 and on another of its negated inputs the digital peak signal P7/. Thus, if an extraneous peak appears at any of the significant sample points $P_3$, $P_4$ or $P_7$ for a character 9 the output of NOR gate 260 will assume a high logic state causing its associated flip-flop 279 to become set and output a high logic state EPDC9 error peak detected for character 9 signal. The digital required peak signal RP5 is provided at yet another negated input of NOR gate 260 in order to prevent the misreading of a poorly encoded character 1 symbol 206 (FIG. 8B) as a character 9. The absence of this required peak at sample point $P_5$ is indicated by a low logic state RP5 digital signal that causes associated flip-flop 279 to assume a set state via NOR gate 260 and to output from the Q output of flip-flop 270 a high logic state EPDC9 error peak detected for character 9.

While various symbols in addition to the numeric characters 0 through 9 are represented in the standard E13-B font of voltage waveforms, these additional symbols do not present a statistically significant error peak problem to warrant the use of extraneous and required peak detection in the character recognition system of the present invention.

The entire set of $EPDC_n$ error peak detected for numeric characters 0 to 9 signals are simultaneously provided as output from the peak error detection logic 124 (FIGS. 12, 13 & 14) upon the occurrence of a FTP fine timing pulse and transmitted in parallel to peak error gating logic circuit 126 to determine whether an error peak has been detected for the particular character that has been preliminarily recognized by the correlation network 110, buffer amps circuit 114 and pre-character recognition logic 118. The particular character that is preliminarily recognized by the pre-character recognition logic circuit 118 is represented by a corresponding $PCR_n$ digital pre-character recognition signal. This $PCR_n$ digital pre-character recognition signal is fed to the peak error gating logic 126 while its binary complement $PCR_n/$ is transmitted to the BCD converter 132.

Figure 15A:
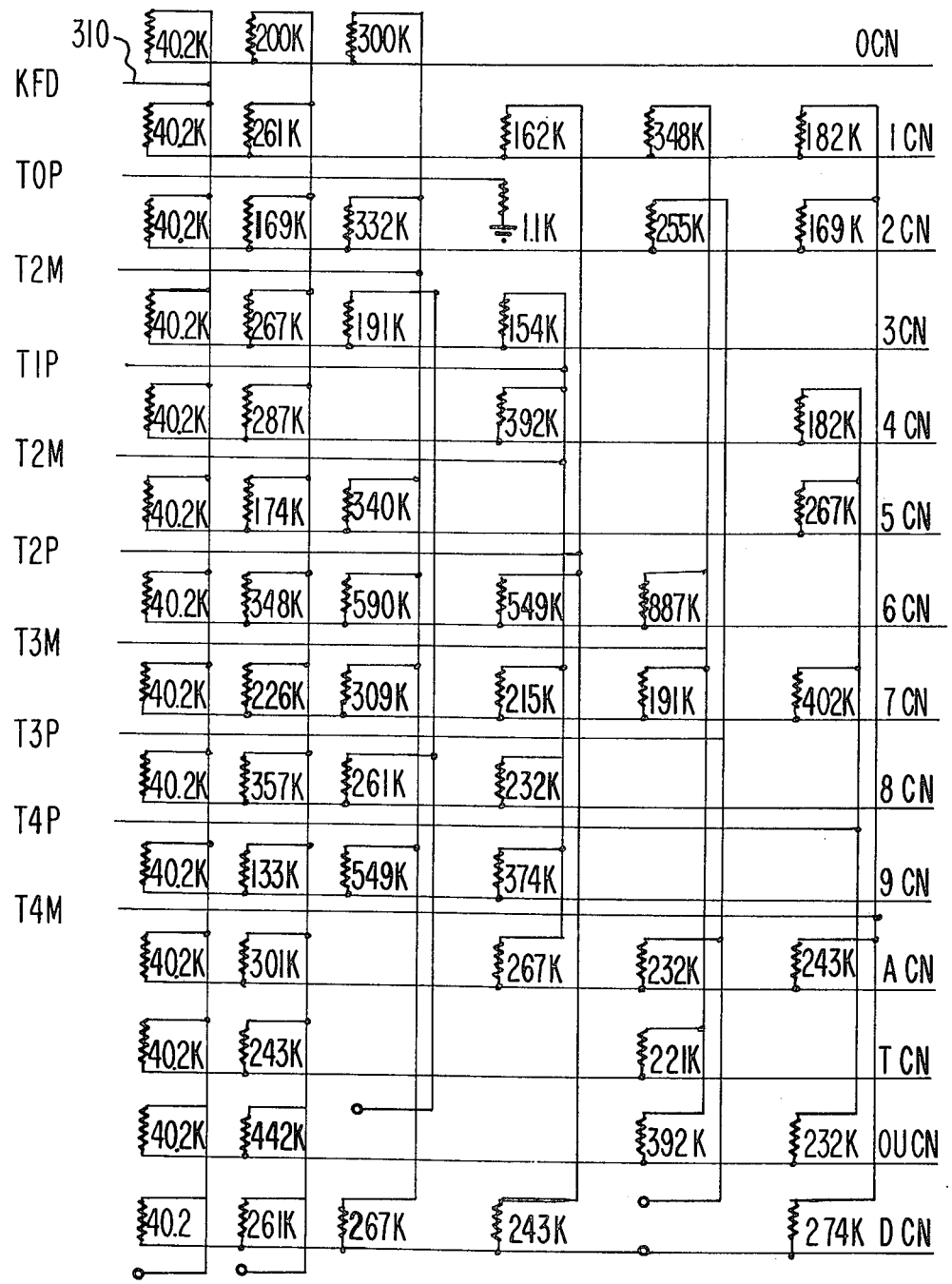
FIGS. 15A and 15B are complementary portions of a detailed schematic diagram showing the precise resistor values established by the design technique of the present invention for each of the resistors employed in the correlation network of FIG. 1.
Figure 15B:
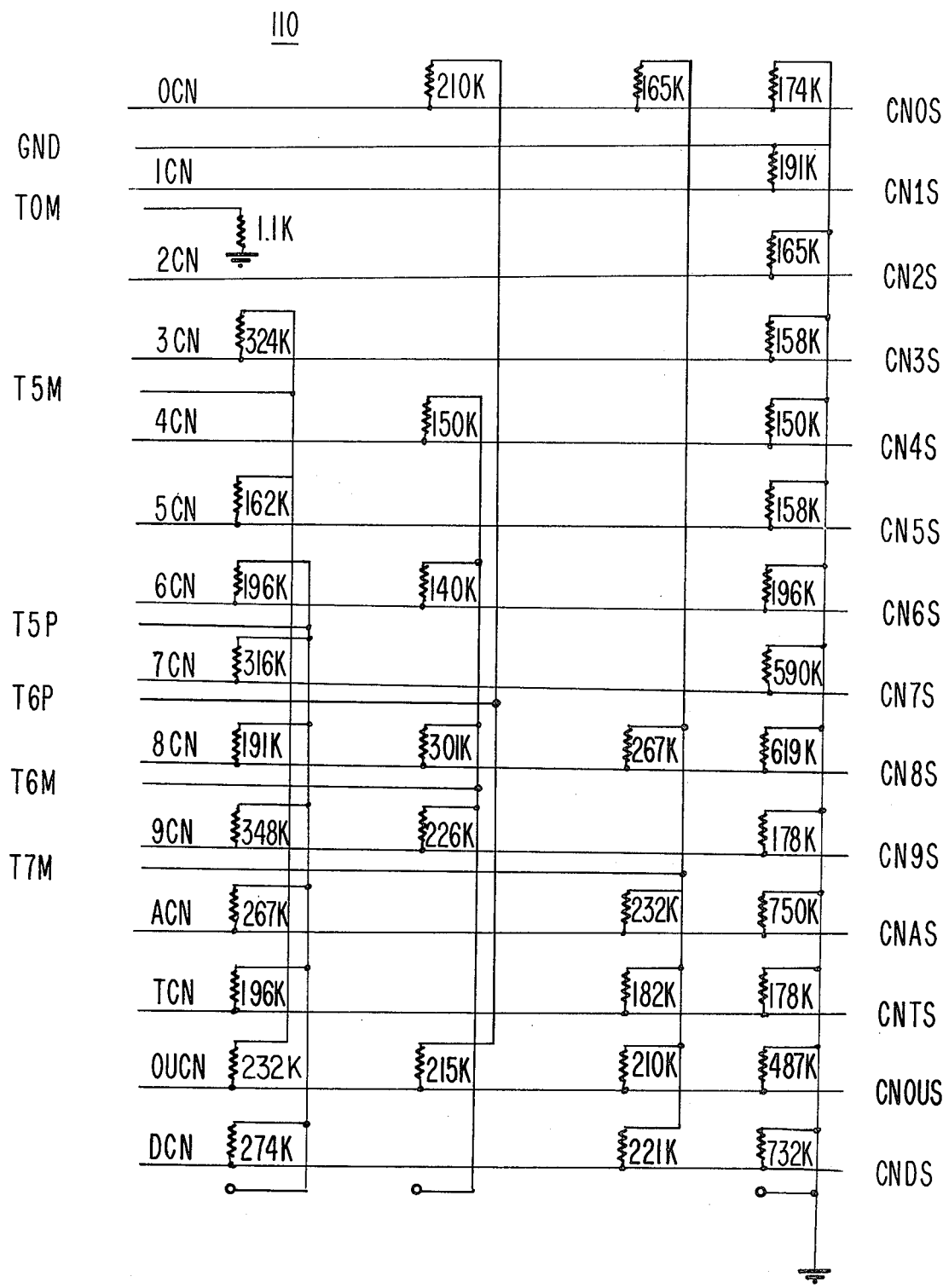

Referring now to FIGS. 15A and 15B the correlation network 110 is shown comprising a plurality of unique resistor arrays. Each resistor array represents a unique ideal character waveform.

PRELIMINARY CHARACTER RECOGNITION

The correlation network 110 is employed in the preliminary character recognition of the present invention to effect a correlation operation between the induced voltage waveform appearing on the dual polarity delay line 108 (FIG. 1) and the set of standard signals permanently stored in the correlation network 110. According to known techniques, a correlation occurs between the induced voltage waveform appearing on the dual polarity delay line 108 and the stored ideal signal representation of that character. A comparison between any character waveform appearing on the dual polarity delay line 108 and any stored waveform, other than the stored waveform associated with that particular character will provide a summation or integrated correlation function output, designated $CN_nS$, which will be less than the summation or integrated correlation function output $CN_nS$ between the character waveform on the delay line 108 and its assigned or associated stored ideal waveform.

Prior correlation networks were designed for use in character recognition systems by measuring the voltage level of the waveforms at the initial delay line tap and then calculating the voltage levels to be employed for each of the succeeding delay line taps that are significant for determination of resistor values for each resistor array corresponding to a particular E13-B voltage waveform. In the present invention, the resistor values for the correlation network were precisely determined by evaluating the actual voltage of the character waveforms at each tap of the delay line 108 associated with each of the different character resistive arrays of the correlation network 110. It will be noted that for the correlation network 110, representative values for the resistors, therein, have been included in FIGS. 15A and 15B. Each resistor array can be said to define the ideal waveform of the character to which it is assigned. The resistor values are selected for each resistor array such that if the waveform of the character with which that network is associated, is present on the delay line 108 at an optimum sampling time, there is a relative maximum $CN_nS$ signal where $n$ identifies the unique character assigned that ideal waveform, from the representative correlation network. This $CN_nS$ output is a relative maximum because it is maximum in comparison to all other correlation network outputs at that optimum sampling time. For a more detailed explanation of the specific structure and operation of such a correlation network reference should be made to U.S. Pat. No. 3,103,646 which is incorporated by reference herein. It will be remembered, however, that the design techniques employed as part of the present invention are significantly improved over other design techniques such as those employed for the correlation network disclosed in U.S. Pat. No. 3,103,646. Again, this improved design technique employs the actual voltages appearing on each tap of the delay line 108 for a given character waveform in determining the precise resistor values to be selected for each corresponding resistor array of the correlation network. A substantial improvement in character recognition system performance is obtained by the increased reliability of the correlation network operation over prior design techniques in which only one sample point for a character waveform was measured with the voltage peaks for the other pertinent sample points being theoretically calculated.

Figure 16A:
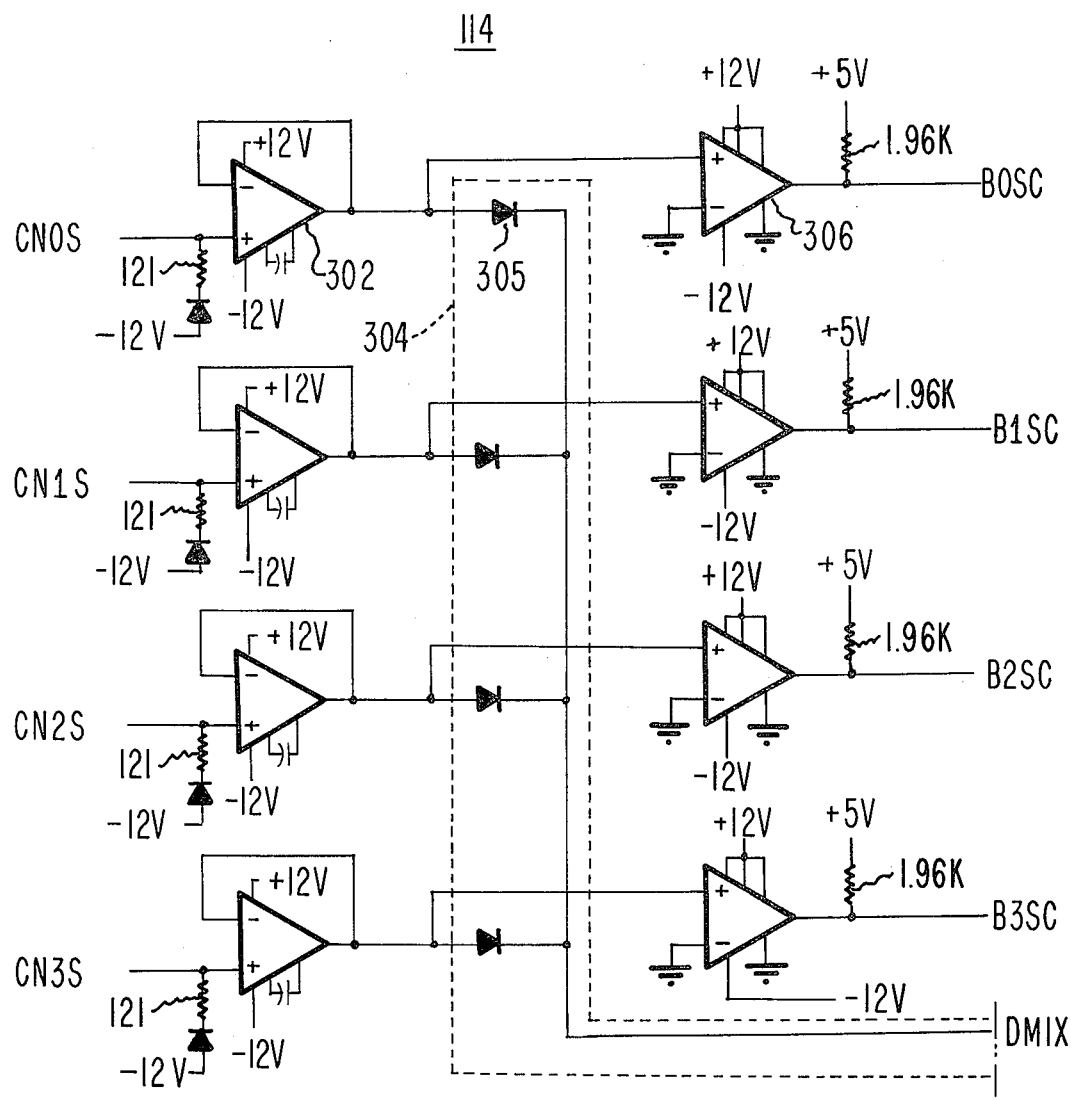
FIGS. 16A and 16B and 16C together form a schematic diagram of the buffer amps circuit of FIG. 1.
Figure 16B:
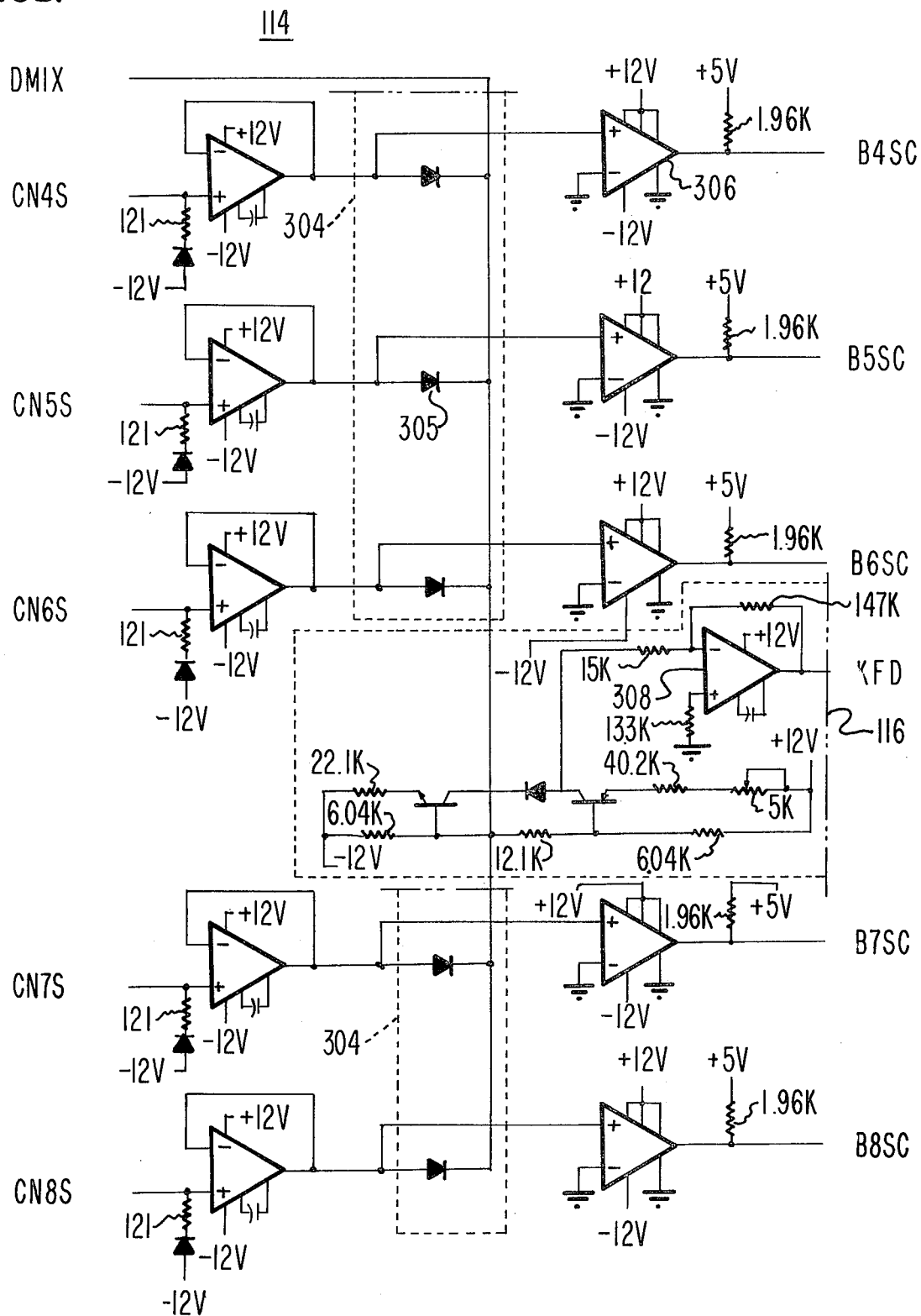
Figure 16C:
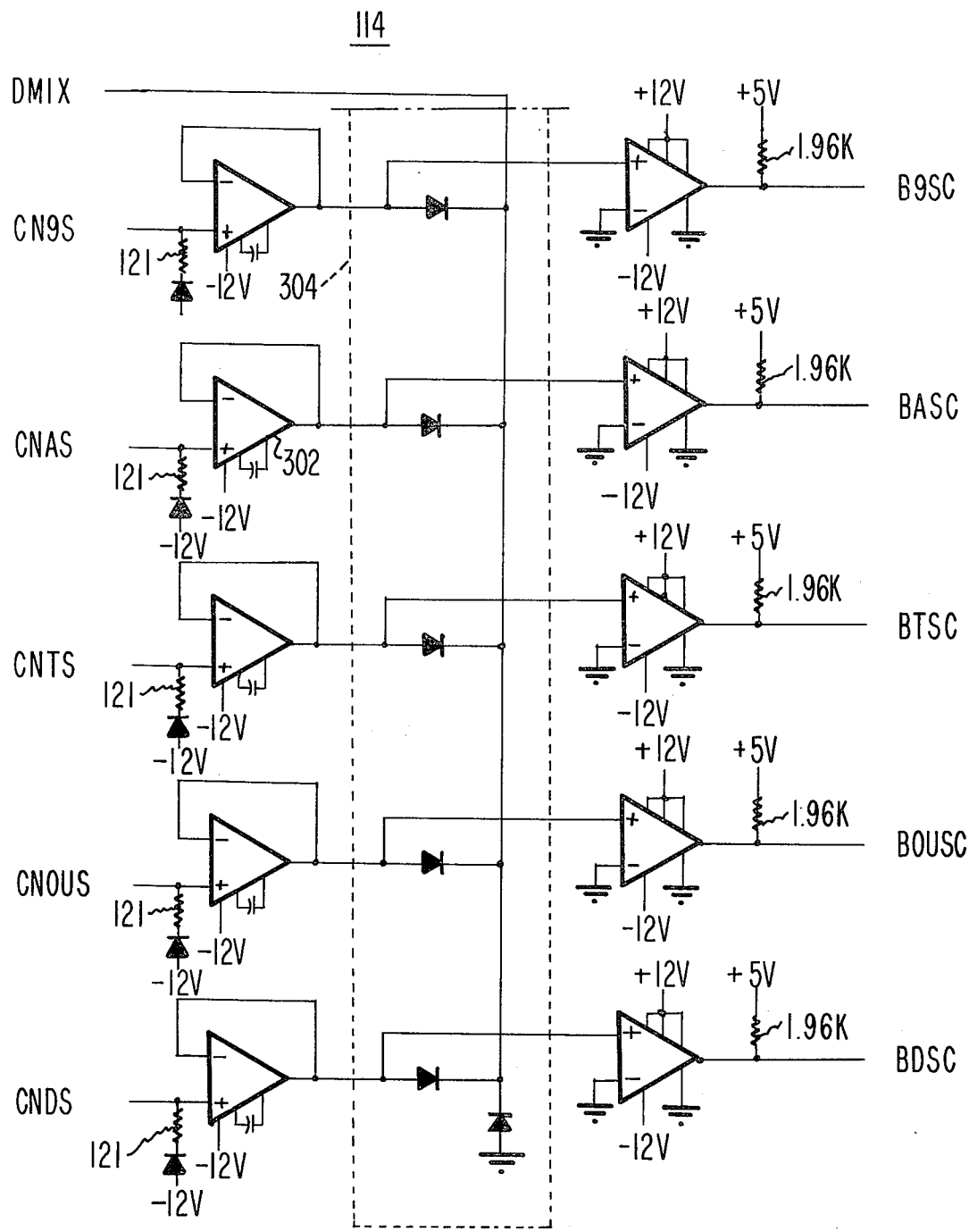

All of the $CN_nS$ correlation network output signals are fed in parallel to the input of the buffer amps circuit 114. The buffer amps circuit 114 comprises a two-stage network employed to define the optimum sample time for sampling the contents of the dual polarity delay line 108, and also to convert the $CN_nS$ analog signals output from the correlation network 110 to digital voltage signals designated $B_nSC$. The $CN_nS$ analog signals output from the correlation network 110 are individually fed to the positive input of associated buffers 302 comprising the first stage of the two-stage buffer amps circuit 114 (FIGS. 16A, 16B & 16C). Only one of these $CN_nS$ analog signals output from the correlation network should be positive at the sample time and that particular correlation network output signal should identify the character whose waveform stored in the dual polarity delay line 108 by correlation with the proper ideal waveform stored in the correlation network 110. The positive $CN_nS$ correlation network output signal causes its associated first stage buffer amplifier 302 to output a positive voltage signal. The output of each of the first stage buffer amps 302 are individually input to the anode of diodes 305 which collectively comprise the diode mixer circuit 304. Thus, the positive voltage output from the first stage buffer amps 302, corresponding to the identified resistor array, forward biases its associated diode 305 while reverse biasing all remaining diodes of the diode mixer 304. When this occurs, a positive voltage is applied to the negative input of the amplifier 308 (FIG. 16B) of the K amp circuit 116. The amplifier 308 output signal which is designated KFD, is fed back to the correlation network via input line 310 (FIG. 15A). As the waveform traveling through the dual polarity delay line becomes better seated therein and more closely approximates an ideal E13-B standard character waveform, the positive $CN_nS$ correlation network output signal rises to a relative maximum positive voltage. While this $CN_nS$ correlation network output is rising, the KFD output from the amplifier 308 of the K amp circuit will be falling and effectively cancels all $CN_nS$ correlation network output voltages that have an amplitude less than the amplitude of the $CN_nS$ correlation network output voltage representative of the character waveform stored in the dual polarity delay line 108. This degenerative KFD feedback insures that only the identified output from the $CN_nS$ correlation network output signal is positive.

The diode mixer 304 operates in a manner similar to a standard OR gate. A voltage appearing at the common cathode junction of diodes 305 will be substantially equal to the highest character correlated voltage signal communicated to the anode side of the diodes 305. The amplifier 308 is a conventional negative feedback type having an output with a voltage gain of $-2K/(1-K)$, where K is greater than zero but less than one. Thus, the KFD degenerative feedback signal reduces every $CN_nS$ correlation network output signal that is less than the highest $CN_nS$ correlation network output signal by a factor at least $(1-K)$, to a negative value. In the preferred embodiment of the present invention, K is chosen such that the KFD degenerative feedback signal will be approximately 89% of the $CN_nS$ positive correlation network output signal and unless another $CN_nS$ correlation network output signal is within 11% of the $CN_nS$ positive correlation network output signal that is not being negatively fed back, then that positive $CN_nS$ correlation network output signal will be the only identified signal output from the correlation network that is positive. The amplifier 308 in the K amplifier circuit 116 may be any DC operational amplifier having a stable fixed gain.

The second stage comparators 306 of the buffer amp circuit 114 receives at their positive input the output from the first stage buffer amplifiers 302. The particular second stage buffer amplifier 306 that receives the identified positive output from its associated first stage buffer amplifier 302 will provide a high logic state $B_nSC$ digital output signal while the other $B_nSC$ outputs of the second stage buffer amplifiers 306 will provide low logic level $B_nSC$ digital output signals. These $B_nSC$ digital output signals from the buffer amps circuit 114 are employed as digital input to the pre-character recognition logic circuit 118 (FIGS. 12, 13 & 14) by individually coupling the output of the second stage buffer amplifiers 306 to the D input of individually associated D-type flip-flops 280. Only one of the flip-flops 280 should receive a high logic state $B_nSC$ digital buffer amp digital output signal. This identified flip-flop 280 will be set on the next FTP fine timing pulse received at its clock pulse input C. This sole set flip-flop 280 will thereby provide a high logic state $PCR_n$ digital signal at its Q output and a low logic state $PCR_n/$ signal at its Q/ output. All of the remaining flip-flops 280 receiving low logic state $B_nSC$ digital buffer amp outputs at their D-type input will be in a reset state having low logic level $PCR_n$ signals on their Q outputs and high logic level $PCR_n/$ signals at their Q/ outputs. Thus, a digital indication of the character that has been preliminarily identified is stored in the pre-character recognition flip-flops 280.

PEAK ERROR GATING

Figure 17:
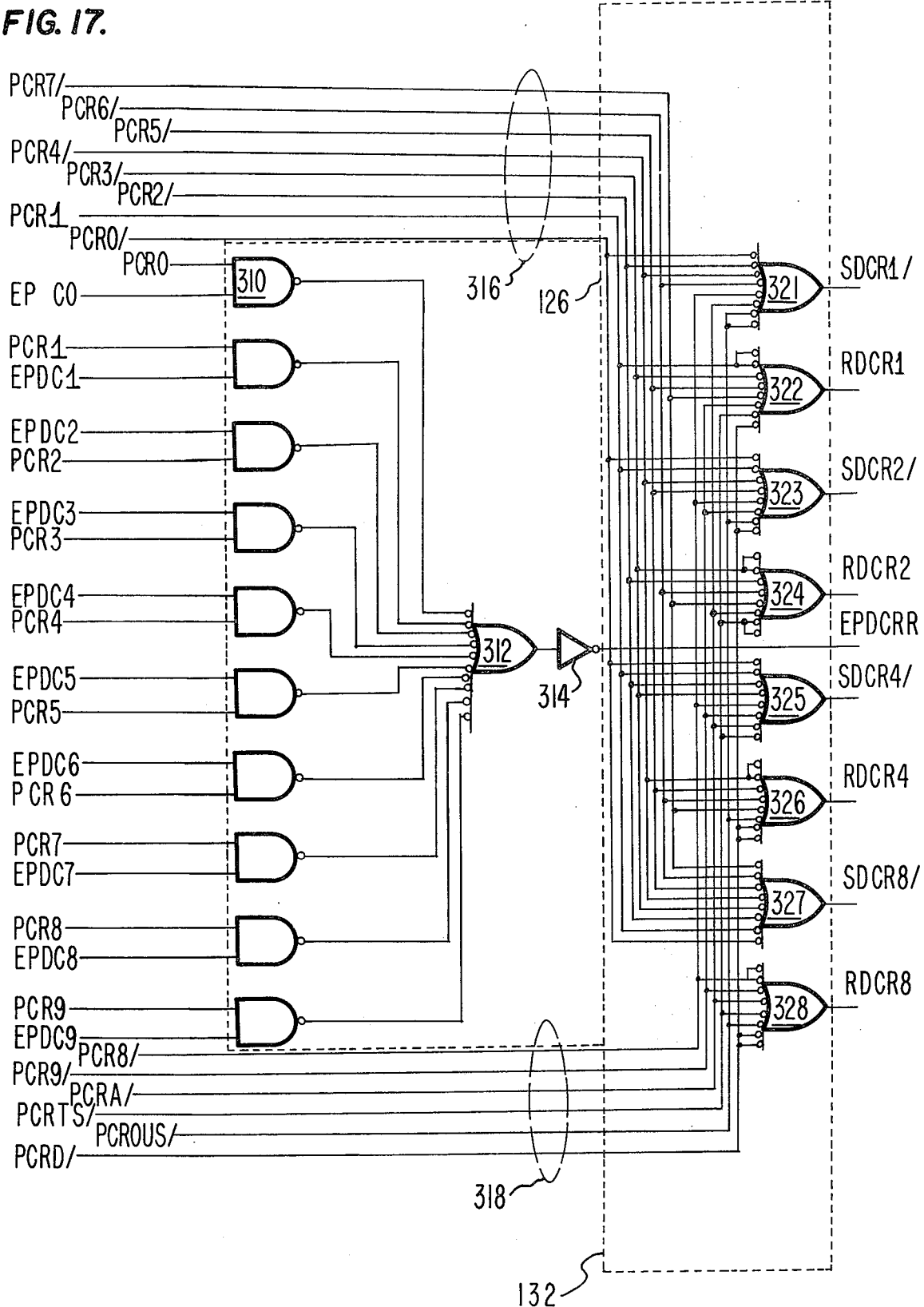
FIG. 17 is a logic diagram of the peak error gating logic and the BCD converter of FIG. 1.

The peak error detection logic circuit 124 (FIGS. 12, 13 & 14) determines whether there is a combination of either an absence of required peaks or the presence of extraneous peaks for any character that may have a statistically significant probability of peak error. The peak error gating logic 126 (FIG. 17) determines whether or not a peak error exists for the particular character that is preliminarily identified. To this end, peak error gating logic 126 comprises a plurality of dual input NAND gates 300 whose output is received at the negated inputs of NOR gate 312. The output of NOR gate 312 is inverted by inverter gate 314. The output of inverter gate 314 comprises the output of the peak error gating logic 126 and is designated as signal EPDCRR. A low logic state EPDCRR digital signal indicates that an error peak has been detected for the character that is identified and a reject signal is to be generated. Each of the NAND gates 300 of the error gating logic 126 receives on one of its two inputs a unique $PCR_n$ signal along with the corresponding $EPDC_n$ error peak detected signal for that particular character.

If both the $PCR_n$ and $EPDC_n$ signals for a particular character are in a high logic state, then a peak error has occurred for the particular character that has been preliminarily identified and the associated NAND gate 300 that simultaneously receives these two high logic state signals will output a low logic state signal that will result in a low logic state EPDCRR reject signal via NOR gate 312 and inverter gate 314. If, however, the $PCR_n$ signal representing the particular character that has been preliminarily identified is in a high logic state while the corresponding $EPDC_n$ error peak detected signal for that particular character is in a low logic state, then the output of the NAND gate 300 receiving these outputs will remain in a high logic state and the EPDCRR output signal from the peak error gating logic will remain in a high logic state via NOR gate 312 and inverter gate 314, indicating that there were no peak errors present for the particular character being identified. Conversely, if a high logic state $EPDC_n$ error peak detected signal appears as input to one or more of the remaining NAND gates 300 while a corresponding $PCR_n$ preliminary character recognition signal for that particular character is in a low logic state, representing that particular character as not being the character preliminary identified, then the output of the NAND gate 300 receiving those signals as input will remain in a high logic state and no reject due to peak error signal will result. Thus, the peak error gating logic 126 of the present invention enables both extraneous and required peak error detection and determination to be made simultaneously with preliminary character recognition.

OUTPUT CONTROL

The BCD binary coded decimal converter 132 (FIG. 17) comprises a plurality of multi-input NOR gates 321, 322, 323, 324, 325, 326, 327 and 328. Each of these NOR gates of the BCD binary coded decimal converter 132 receives at its negated inputs selected ones of the $PCR_n/$ pre-character recognition digital output signals from the Q/ output of the D-type flip-flops 280 (FIGS. 12, 13 & 14) comprising the pre-character recognition logic 118. As explained previously, if a certain character is preliminarily identified, its associated D-type flip-flop 280 will have a high logic state $PCR_n$ signal at its Q output and a low logic state $PCR_n/$ signal at its Q/ output. Conversely, all other D-type flip-flops 280 should have low logic state $PCR_n$ signals on their Q output and high logic state $PCR_n/$ signals on their Q/ outputs. Therefore, a low logic state $PCR_n/$ signal indicates that the character represented by that particular signal is the particular character preliminarily recognized.

NOR gate 321 (FIG. 17) receives at its negated inputs the $PCR_n/$ signals where $n = 0, 2, 4, 6, 8, A,$ and OUS. The SDCR1/ output of the NOR gate 321 will be in a high logic state when any one of these inputs are in a low logic state. NOR gate 322 receives at its negated inputs the $PCR_n/$ signals where $n = 1, 3, 5, 7, 9, TS$ and D. The RDCR1 signal output from NOR gate 322 will be in a high logic state when any of the preceeding inputs to NOR gate 322 are in a low logic state. NOR gate 323 receives at its negated inputs the $PCR_n/$ signals where $n = 0, 1, 4, 5, 8, 9,$ OUS and D. The NOR gate 323 output designated SDCR2/ will be in a high logic state whenever any of these inputs to NOR gate 323 is in a low logic state. The NOR gate 324 receives at its negated inputs the $PCR_n/$ signals where $n = 2, 3, 6, 7, A,$ and TS. Whenever any of these inputs to NOR gate 324 is in a low logic state it will output a high logic state PDCR2 signal. NOR gate 325 receives at its negated inputs the $PCR_n/$ signals where $n = 0, 1, 2, 3, 8, 9, A$ and TS. Whenever any of these inputs to NOR gate 325 is in a low logic state, its output designated SDCR4/ will be in a high logic state. NOR gate 326 receives on its negated inputs the $PCR_n/$ signals where $n = 4, 5, 6, 7,$ OUS and D. Whenever any of these inputs to NOR gate 326 are in a low logic state, its RDCR4 output will be in a high logic state. The NOR gate 327 receives at its negated inputs the $PCR_n/$ signals where $n = 0$ through 7. Whenever any of these inputs are in a low logic state, the output of NOR gate 327 designated SDCR8/ will be in a high logic state. The remaining NOR gate 328 of the BCD binary coded decimal converter 132 receives at its negated inputs the $PCR_n/$ signals where $n = 8, 9, A, TS,$ OUS and D. The output of NOR gate 328 designated RDCR8 will be in a high logic state whenever any of these inputs is in a low logic state. Thus, the $SDCR_n/$ signals collectively comprise a binary coded decimal representation of the particular character that has been preliminarily recognized while the $RDCR_n$ signals collectively comprise the binary complement of the $SDCR_n/$ signals. It should be noted that signal $SDCR_n/$ where $n = 1$ comprises the least significant bit of the binary coded decimal representation of the preliminarily recognized character while signal $SDCR_n/$ where $n = 8$ comprises the most significant bit.

If any two of the $PCR_n/$ signals are both in a low logic state, then more than one character has been preliminarily recognized and a reject signal should be flagged. With the $PCR_n/$ signals input to the NOR gates 321 through 328 of the BCD binary coded decimal converter 132 arranged as described hereinbefore, a double character misread error will be indicated by both the $SDCR_n/$ signal and the corresponding $RDCR_n$ signal being in a high logic state.

Figure 18:
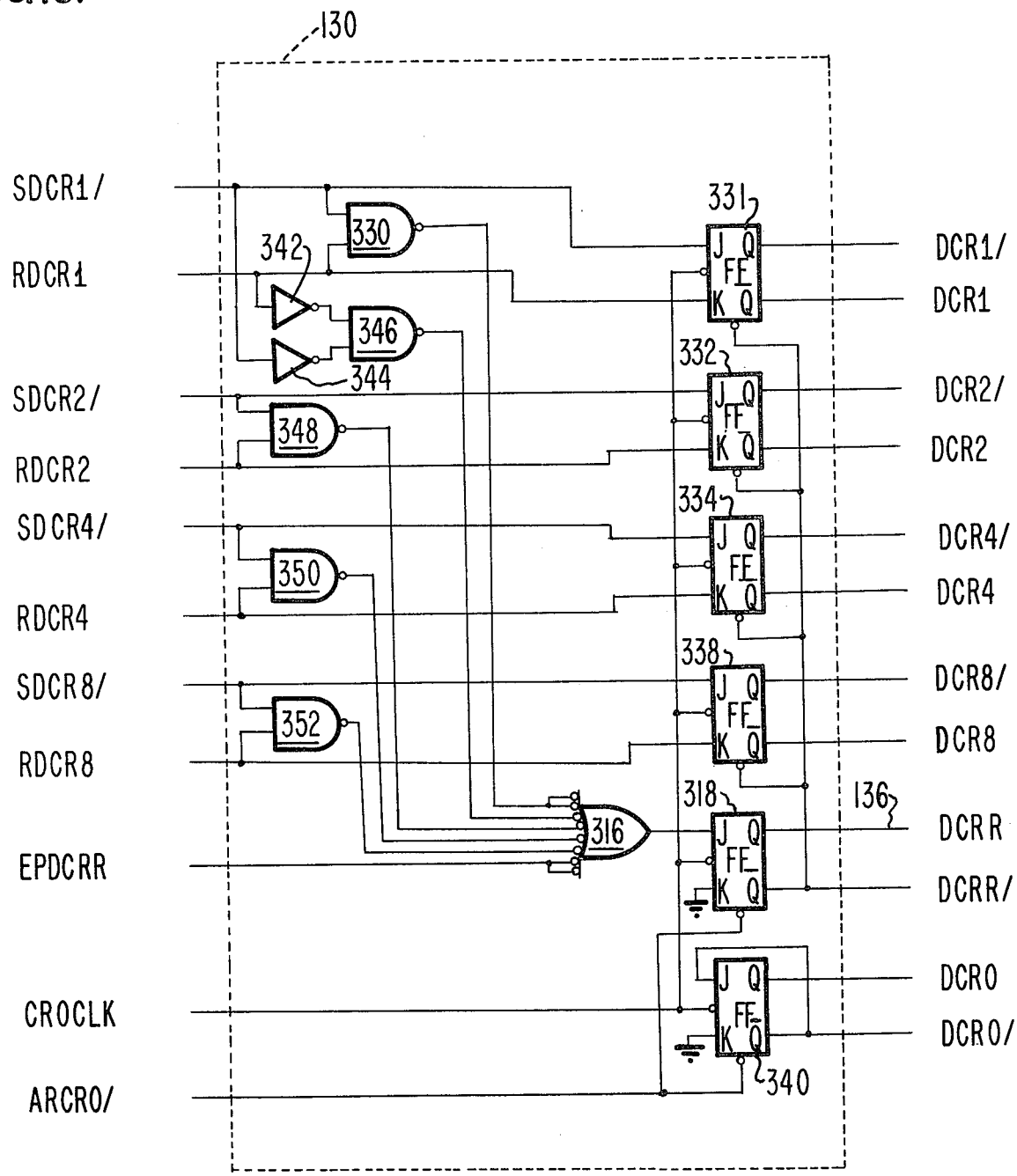
FIG. 18 is a logic diagram of the output control logic of FIG. 1.

Referring now to FIG. 18, the details of the output control logic 130 are set forth. The $SDCR_n/$ signals are individually fed as one input to NAND gates 330, 348, 350 and 352 while the $RDCR_n$ signals are individually fed as the other input. Therefore, if more than one character has been preliminarily recognized, one of the NAND gates 330, 348, 350 or 352 will have a low logic state output that will cause the NOR gate 316 to output a high logic state signal setting the reject flip-flop 318 whose Q output will provide a high logic state DCRR signal and whose Q/ output will provide a low logic state DCRR/ signal, both indicative of a reject signal. Also, if no character has been preliminarily recognized, then both SDCR1/ and RDCR1 will be in a low logic state and after being inverted by inverter gates 342 and 344 respectively, cause NAND gate 346 to output a low logic state signal that will result in NOR gate 316 outputting a high logic state signal that sets flip-flop 318 which in turn outputs a high logic state DCRR reject signal on line 136.

The accept flip-flop 340 (FIG. 18) receives at its clock pulse input the character recognition output clock pulse designated CROCLK. When the flip-flop 340 is in a set state, it will output a high logic state DCRO DC readout signal upon the occurrence of a CROCLK signal. This high logic state DCRO signal may be employed to provide an indication that a character has been properly read and identified. The CROCLK character recognition output clock is input to the clock pulse terminals of each of the output flip-flops 331, 332, 334, 338, the reject flip-flop 318 as well as the accept flip-flop 340. Both the reject flip-flop 318 and the accept flip-flop 340 are reset upon the occurrence of an ARCRO/ signal that indicates the restart of the character recognition operation. Both the CROCLK and ARCRO/ signals are generated by the variable threshold controlled timing circuit 140 as explained hereinafter. The following table sets forth in $SDCR_n$ output of the BCD converter 132 along with its binary complement output $DCR_n$ from output control logic 130 for each $PCR_n/$ pre-character recognition signal in the entire E13-B character font.

BCD CHARACTER RECOGNITION OUTPUT

|        | SDCR8/ | SDCR4/ | SDCR2/ | SDCR1/ | DCR8 | DCR4 | DCR2 | DCR1 |
|--------|--------|--------|--------|--------|------|------|------|------|
| PCR0/  | 1      | 1      | 1      | 1      | 0    | 0    | 0    | 0    |
| PCR1/  | 1      | 1      | 1      | 0      | 0    | 0    | 0    | 1    |
| PCR2/  | 1      | 1      | 0      | 1      | 0    | 0    | 1    | 0    |
| PCR3/  | 1      | 1      | 0      | 0      | 0    | 0    | 1    | 1    |
| PCR4/  | 1      | 0      | 1      | 1      | 0    | 1    | 0    | 0    |
| PCR5/  | 1      | 0      | 1      | 0      | 0    | 1    | 0    | 1    |
| PCR6/  | 1      | 0      | 0      | 1      | 0    | 1    | 1    | 0    |
| PCR7/  | 1      | 0      | 0      | 0      | 0    | 1    | 1    | 1    |
| PCR8/  | 0      | 1      | 1      | 1      | 1    | 0    | 0    | 0    |
| PCR9/  | 0      | 1      | 1      | 0      | 1    | 0    | 0    | 1    |
| PCRA/  | 0      | 1      | 0      | 1      | 1    | 0    | 1    | 0    |
| PCRTS/ | 0      | 1      | 0      | 0      | 1    | 0    | 1    | 1    |
| PCROUS/| 0      | 0      | 1      | 1      | 1    | 1    | 0    | 0    |
| PCRD/  | 0      | 0      | 1      | 0      | 1    | 1    | 0    | 1    |

BCD CHARACTER RECOGNITION OUTPUT-continued

| | SDCR8/ | SDCR4/ | SDCR2/ | SDCR1/ | DCR8 | DCR4 | DCR2 | DCR1 |
|---|---|---|---|---|---|---|---|---|
| DCRR/ | | | | | 1 | 1 | 1 | 1 |

SYSTEM TIMING CONTROL

A two-phase variable threshold timing is employed in the present invention to enable the voltage waveform present in the dual polarity delay line 108 to be sampled at an optimum time to maximize the accuracy of reading the voltage waveform. The two-phase timing control includes coarse timing established in response to the movement of the voltage waveform through the delay line 108 and a fine timing that is determined by the output of the K amp circuit 116.

Figure 19:
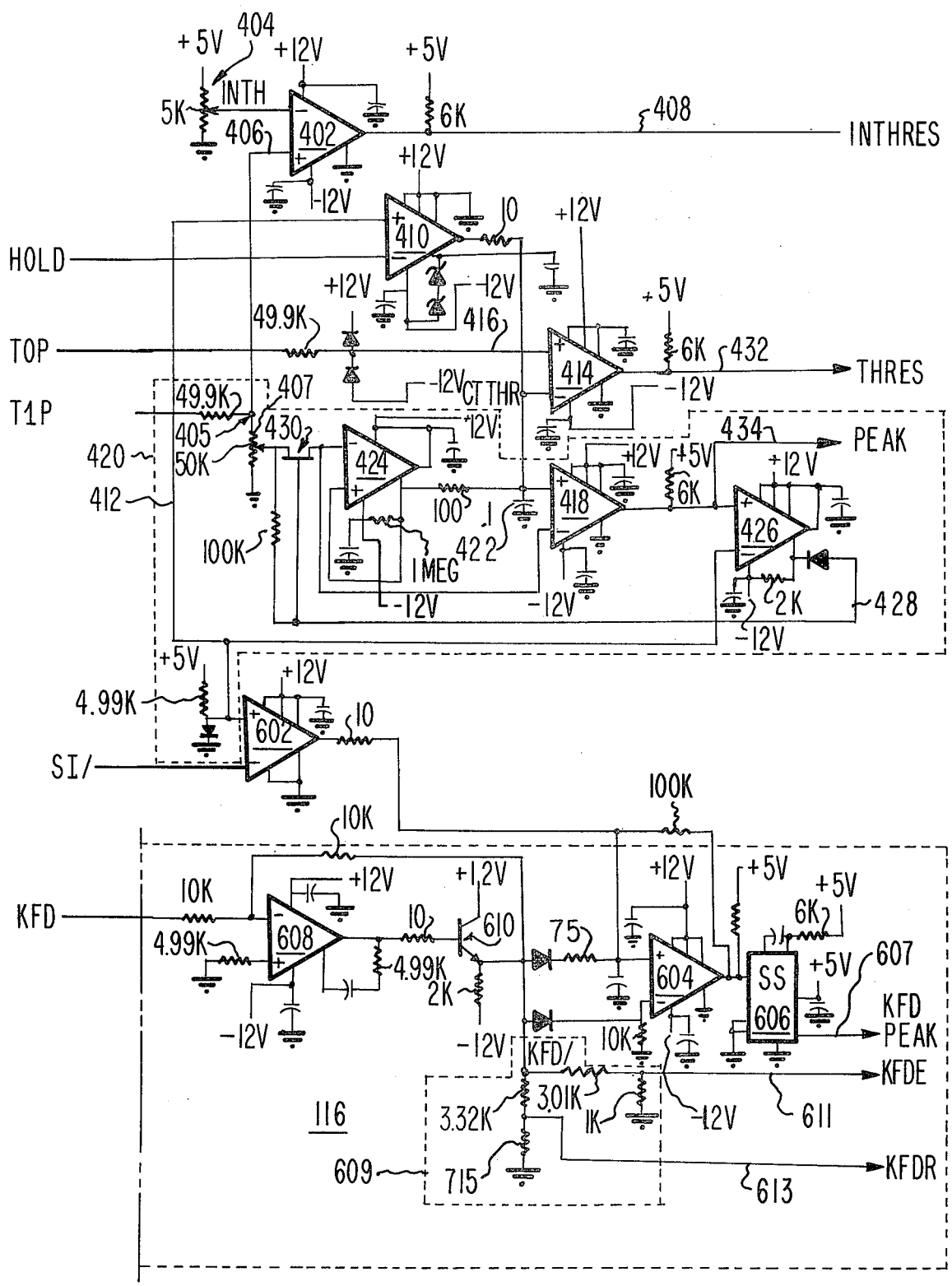
FIG. 19 is a schematic diagram of a portion of the variable threshold controlled timing circuit and K amp circuits of FIG. 1.

Referring now to FIG. 19, the initial threshold for system timing is provided by means of a comparator 402 which receives at its negative input a predetermined input threshold voltage designated as INTH. This input threshold voltage INTH is fixed at a predetermined desired voltage level by adjustment of potentiometer 404. Comparator 402 receives at its positive input the analog voltage appearing on the outputs of the TIP tap of the dual polarity delay lie 108 (FIG. 1). As the voltage waveform moves from the initial P7 tap toward the final P0 tap of the dual polarity delay line 108, a voltage will eventually appear at tap TIP corresponding to the leading edge of the character that induced the voltage waveform traveling through the delay line. When the voltage of this TIP tap, input to the positive input of comparator 402 via voltage divider 405, exceeds the input threshold voltage INTH, a positive pulse designated as INTHRES is output via line 408 representing that the initial timing threshold has been achieved. This initial timing threshold signal INTHRES is input to NAND gate 502 (FIG. 21) along with the Q/ output of flip-flop 504, which is initially latched in a high logic state. Thus, a low logic state binary output is generally by NAND gate 502 resetting flip-flop 506 whose Q output signal, designated as HOLD, assumes a low logic condition. The Q ouput of flip-flop 506 is coupled to the negative input of comparator 410 (FIG. 19). The positive input of comparator 410 is coupled to a reference voltage via line 412. When the binary valued HOLD signal goes low, the coarse timing threshold signal designated as CTTHR, output from comparator 410, is provided as input to the negative input of comparator 414. The TOP tap of delay line 108 is provided as input to the positive input of comparator 414 via line 416. The CTTHR coarse timing threshold signal output from comparator 410 is also fed as input to the positive input of comparator 418 of the timing peak detector circuit 420. Input to the timing peak detector circuit 420 is provided by means of an adjustable voltage divider 405 which includes 50K potentiometer 407, receiving the voltage present on the TIP tap of the delay line. The timing peak detector circuit includes peak storage capacitor 422 which is coupled to the positive input of comparator 418. The timing peak detector 420 further includes comparators 424 and 426. The peak storage capacitor 422 is charged up to a value proportional to the voltage output from adjustable voltage divider 405, while the binary valued HOLD signal is in a low logic state under the control of comparator 410. After signal TIP has attained a maximum peak and begins to descend, the output of comparator 418 goes to a high binary values logic state indicating that a maximum timing peak has been achieved. The comparator 418 output is designated as a PEAK signal.

The binary valued PEAK signal is provided as input to the positive input of comparator 426. When the PEAK signal goes to a high logic state, the output of comparator 426 is driven to a low logic state. The output of comparator 426 is coupled to a field effect transistor 430 via line 428. The low logic state output of comparator 426 causes the field effect transistor 430 to shut off, thereafter isolating the timing peak detector 420 from the TIP voltage at the P1 tap of the delay line. Thus, the peak storage capacitor 422 is charged up to a voltage corresponding to the maximum peak value of the first peak of an induced character waveform. Once this maximum value has been attained, the field effect transistor 430 shuts off the timing peak detection circuit 420 so that it is not affected by any succeeding peaks on the voltage waveform traveling through the delay line 108.

The comparator 414 compares the CTTHR coarse timing threshold voltage stored on the storage capacitor 422 with the TOP signal received via line 416. As the voltage waveform continues through the delay line 108 toward the P0 tap, the voltage at TOP rises, as induced by the leading edge of the character. When this TOP voltage received at comparator 414 via line 416 exceeds the CTTH coarse timing threshold signal, a positive threshold pulse designated as THRES is generated on line 432. At this time both signals PEAK and THRES will be in high logic states.

Adjustment of the 50K potentiometer 407 feeding the field effect transistor 430 of the variable timing peak detector circuit 420 provides adjustment on the proportion of the TIP signal that is to be stored on the peak storage capacitor 422. This voltage on the peak storage capacitor 422 is an adjustable coarse timing threshold, designated as signal CTTHR and determines the value of signal TOP that must be achieved in order to drive the output of comparator 414 to a high level THRES signal. This enables the timing control to be initialized at an optimum time.

Figure 12:
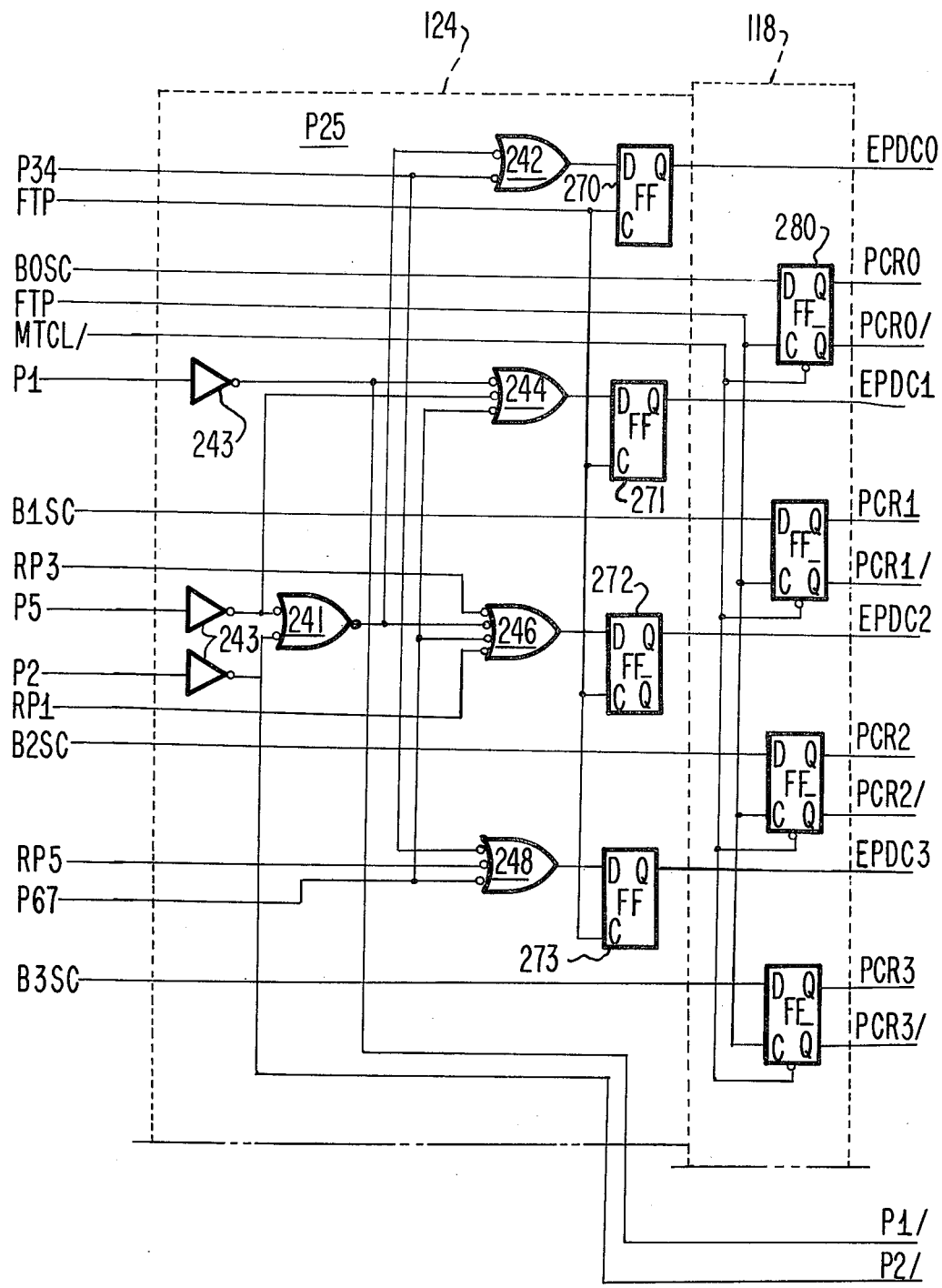
FIG. 12 is a logic diagram of a portion of the pre-character recognition logic of FIG. 1.
Figure 14:
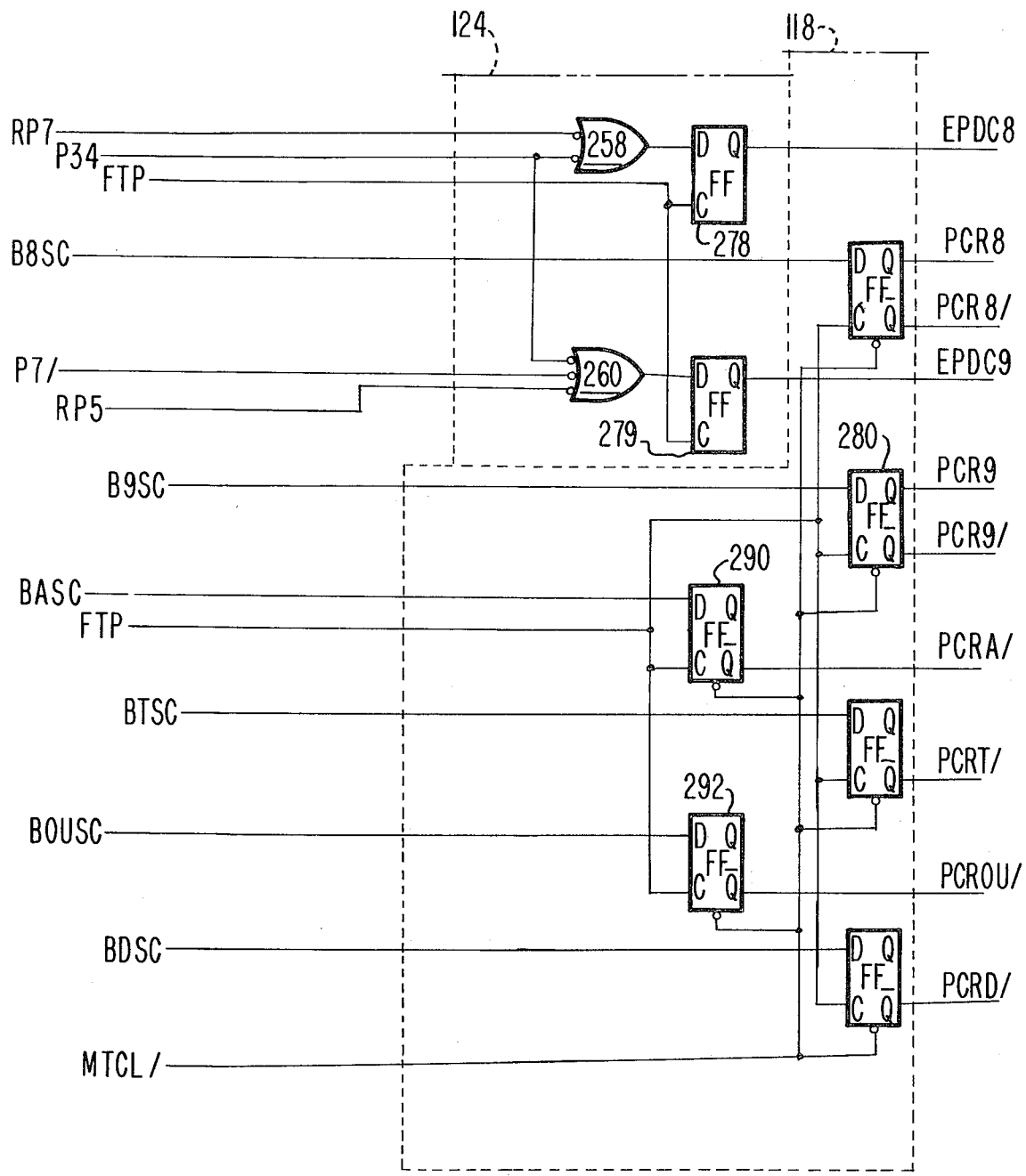
FIG. 14 is a logic diagram of the remaining portion of the peak error detection logic and the remaining portion of the pre-character recognition logic of FIG. 1.
Figure 21:
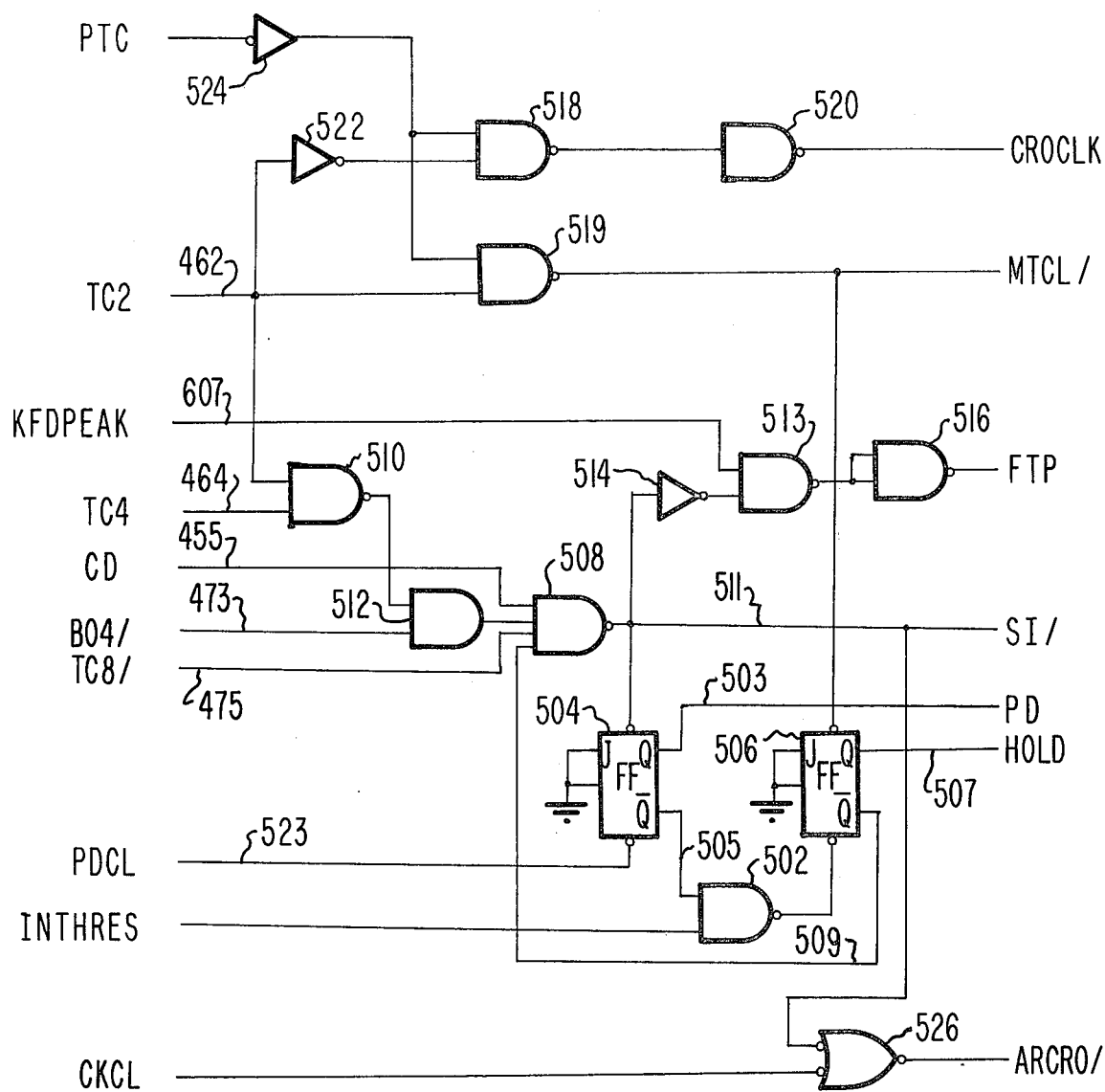
FIG. 21 is the remaining portion of the variable threshold controlled timing of FIG. 1.

Upon initialization of variable threshold controlled timing circuit 140, a short window or sample interval is provided, as illustrated in the timing diagram of FIG. 24, during which the $B_nSC$ digital signals output from the buffer amp circuit 114 (FIGS. 16A, 16B & 16C) is strobed into the pre-character recognition logic circuit 118 (FIGS. 12, 13 & 14) and the $P_n$ signals output from the extraneous peak detector 120 (FIG. 11) and the $RP_n$ signals output from the required peak detector 122 (FIG. 11) are strobed into the peak error detection logic 124 (FIGS. 12, 13 & 14). This sample interval is defined by the presence of a low logic state SI/ sample interval signal at the output of NAND gate 508 (FIG. 21).

Figure 20:
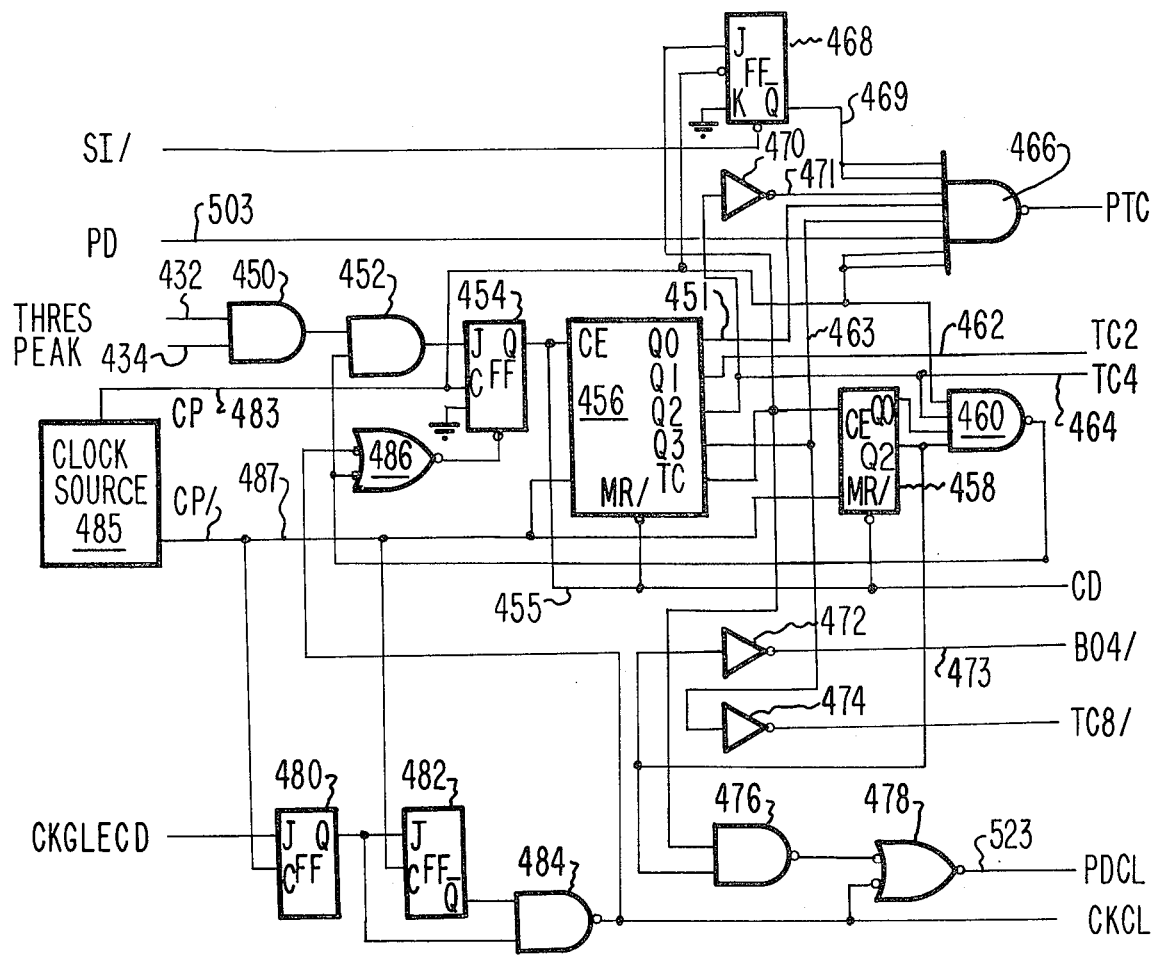
FIG. 20 is a logic diagram of an additional portion of the variable threshold controlled timing of FIG. 1.
Figure 22:
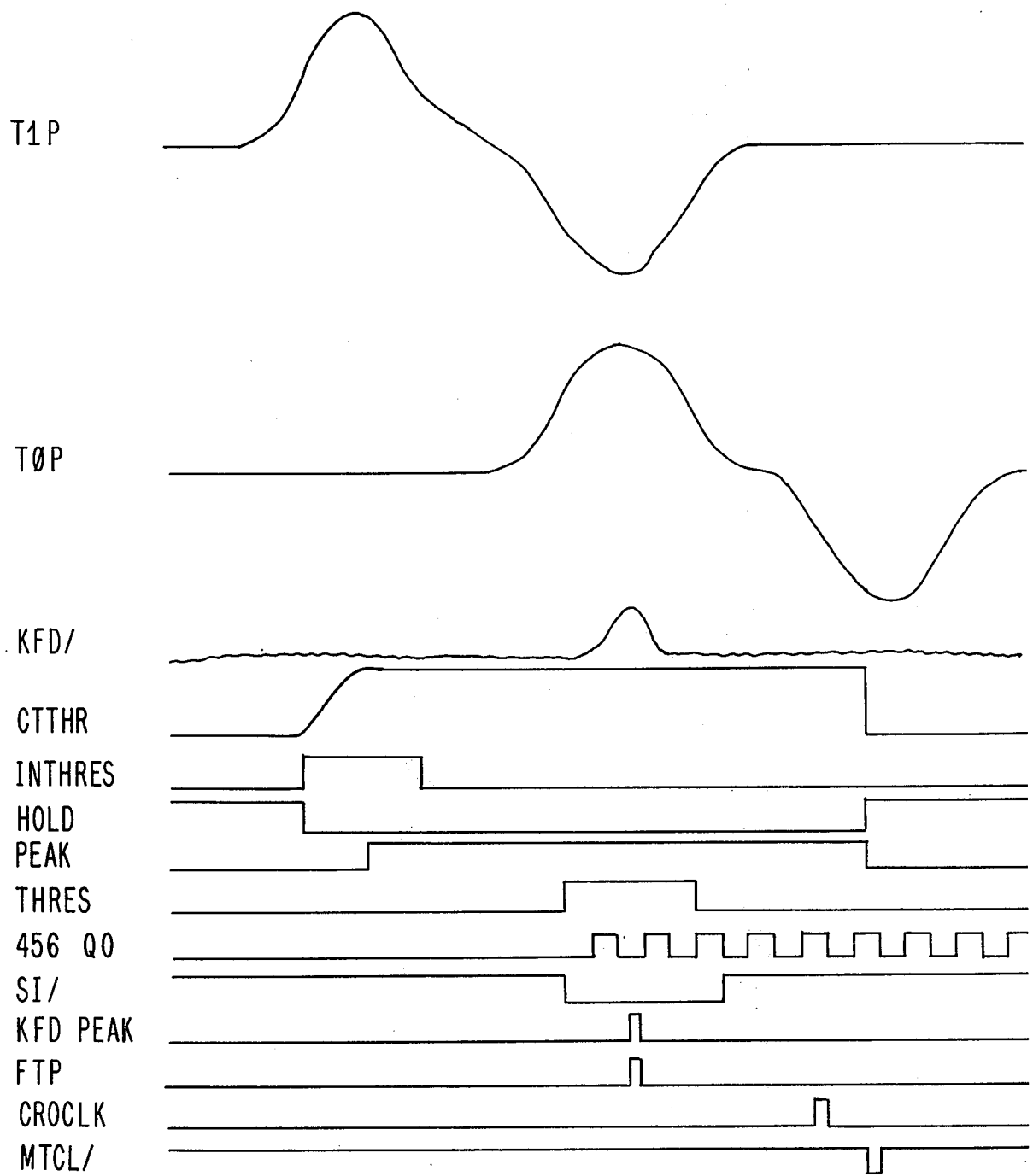
FIG. 22 is a timing diagram illustrating the wave shapes of the signals transmitted during operation of the circuitry and logic of FIGS. 1, 19, 20 and 21.

Referring now to FIGS. 20 and 22, the THRES and PEAK signals are output via lines 432 and 434, respectively, to the AND gate 450. With both THRES and PEAK signals in a high logic state, as occurs upon the TOP signal exceeding the CTTHR coarse timing threshold signal, then the output of AND gate 450 will be in a high logic state. This causes the output of AND gate 452 to assume a high logic state which in turn sets the input flip-flop 454. With input flip-flop 454 in a set state, its Q output assumes a high logic state, thereby enabling a four bit binary counter 456. The four bit binary adder 456 receives at its CE count enable input the high logic state signal from the Q output of flip-flop 454 and commences counting CP/ clock pulses. When six CP/ clock pulses have been counted by four bit binary counter 456, high logic level signals will appear from its Q1 and Q2 outputs on lines 462 and 464, respectively (FIG. 20). The signal appearing on line 462 is designated as TC2 while the signal appearing on line 464 is designated TC4 in the timing diagram of FIG. 23. Until the four bit binary counter 456 achieves a count of six clock pulses, the TC4 signal will be in a low logic condition. Signals TC2 and TC4 are received as input to NAND gate 510 (FIG. 21). Until both signals TC2 and TC4 assume a high logic state, the output of NAND gate 510 will be in a high logic state thereby enabling one input of AND gate 512. With the input flip-flop 454 in a set state, its Q output appearing on line 455 will be seen as a high logic state CD blank-out signal on line 455 (FIGS. 20, 21 & 23). The other input to AND gate 512 is a signal designated as B04/ which is developed from the Q1 output of four bit binary counter 458. The TCF full count indication signal from binary counter 456 enables the two bit binary counter 458 to commence a binary counting operation. Until the two bit binary counter 458 has achieved a high logic state Q2 output, a high logic state signal is designated as B04/, seen on line 473, after having been inverted by inverter gate 472. Similarly, until the four bit binary counter 456 has counted eight CP/ clock pulse signals, its Q3 output will be in a low logic state. The output signal on the Q3 output of four bit binary counter 456 is designated as signal TC8. The binary complement TC8/ of signal TC8 is obtained by inverter gate 474. The TC8/ signal as seen on line 475 will be in a high logic state until the TC8 signal goes high. Thus, the output of AND gate 512 (FIG. 21) is in a high logic state with both the B04/ signal appearing on line 473 and the output of NAND gate 510 being in high logic states. Initially, both the flip-flops 504 and 506 (FIG. 21) are in a reset condition wit low logic signals being seen at their Q outputs on lines 503 and 507 respectively, and high logic conditions being seen at their Q/ outputs on lines 505 and 509 respectively. Thus, with a low logic signal appearing on line 509 from the Q/ output of flip-flop 506, all four inputs to the NAND gate 508 (FIG. 21) are in a high logic state causing NAND gate 508 to output on line 511 a low logic state SI/ sample interval signal upon the input flip-flop 454 (FIG. 20) assuming a set state.

When the four bit binary counter 456 has counted six CP/ clock pulse signals, both TC2 and TC4 signals appearing respectively on lines 462 and 464 (FIG. 21) will be in a high logic state causing the output of NAND gate 510 to assume a low condition. This will in turn cause the output of AND gate 512 to go low which in turn causes the output of NAND gate 508 on line 511 to return to a high logic SI/ signal, thereby terminating the sample interval. Thus, it may be seen that a sample interval of six clock pulses is provided during which the K amplifier circuit 116 (FIGS. 1 and 19) may be monitored for a maximum peak voltage level on the KFD/ analog voltage signal.

The SI/ sample interval signal enables comparator 604 (FIG. 19) by switching comparator 602. For the six clock periods that the SI/ sample interval signal is in a low logic state, the comparator 604 of the K amp circuit 116 is enabled to monitor the KFD/ signal provided at the emitter output of transistor 610 (FIG. 19) for a maximum peak voltage level. The transistor 610 is controlled at its base by the output of differential amplifier 608, which receives at its negative input the KFD signal. When a maximum peak KFD/ signal has occurred, the comparator 604 causes the single shot multivibrator 606 to output a positive pulse of one microsecond duration, designated as a KFDPEAK signal (FIG. 22) on line 607.

The comparator 604 is disabled when the SI/ sample interval signal is in a high logic state, thereby preventing a KFDPEAK signal from being output from the single shot multivibrator 606 except during an actual sample interval. It should also be noted that a voltage divider 609 divides the KFD/ voltage into two different voltage references for extraneous and required peak detection as previously explained. The voltage reference for extraneous peak detection, designated as signal KFDE is output on line 611, while the voltage reference for required peak detection, designated as KFDR, is output on line 613.

The SI/ output from NAND gate 508 (FIG. 21) appearing on line 511 is also employed along with the KFDPEAK signal appearing on line 607 to provide the fine timing pulse, designated as FTP. To this end NAND gate 513 (FIG. 21) receives, on one of two inputs, the KFDPEAK signal from line 607 and at its other input, the SI/ signal on line 511 after having been inverted by inverter gate 514. When the KFDPEAK signal is in a high logic state, which occurs when the single shot multivibrator 606 provides a one clock time duration output pulse on line 607, and the SI/ sample interval signal is in a low logic state, then the NAND gate 513 will produce a low logic state pulse that is inverted by NAND gate 516 to be a high logic state fine timing pulse, designated as FTP (FIG. 22).

A one clock time duration pulse, designated as signal PTC (FIG. 23), is employed to enable the variable threshold controlled timing circuit 140 (FIG. 21) to generate a one clock time duration character recognition output clock pulse, designated as signal CROCLK (FIGS. 22 and 23). This CROCLK signal is employed to clock the output of the BCD converter 132 into the flip-flops 331, 332, 334, 338, 318 and 340 of the output control logic circuit 130 (FIG. 18). This one clock time duration high logic state CROCLK character recognition output clock pulse is generated upon NAND gate 518 (FIG. 21) receiving a low logic level PTC pulse which appears as a high logic state pulse after having been inverted by inverter gate 524, in conjunction with a low logic state TC2 signal on line 462 inverted by inverter gate 522. The output of NAND gate 518 is inverted by single input NAND gate 520.

A main timing clear signal, designated as MTCL/ (FIG. 23) is produced two clock periods after the CROCLK signal is generated. The low logic state MTCL/ signal is provided by NAND gate 519 in response to a high logic state signal TC2 and a low logic state PTC occurring together. The low logic state MTCL/ pulse clears the pre-character recognition flip-flops 280 (FIGS. 12, 13 & 14).

The low logic state PTC pulse (FIG. 23) is generated at the output of multi-input NAND gate 466 (FIG. 20) in response to all inputs to the NAND gate 466 coincidently being in a high logic state. One input to the NAND gate 466 is coupled to the Q/ output of flip-flop 468 via line 469. The flip-flop 468 is reset upon the occurrence of a low logic state SI/ pulse. Thus, a high logic state output appears on line 469 until a high logic state signal is received at the J input to flip-flop 468 from the TC terminal count output of binary counter 456. The NAND gate 466 receives as another input, the Q2 output of the counter 456 on line 471 after having been inverted by inverter gate 470. The Q0 and Q3 outputs of the four bit binary counter 456 are coupled directly as input to the NAND gate 466 via lines 451 and 463, respectively. A yet additional input to the NAND gate 466 is provided via line 503 which carries the PD signal from the Q output of flip-flop 504 of FIG. 21. The PD signal appearing on line 503 will be in a high logic state when the flip-flop 504 is in a set state. This occurs when a high logic state PDCL permit data clock signal (FIG. 23) is output from the NOR gate 478 of FIG. 20 via line 523 in conjunction with a low logic state SI/ signal appearing on line 511 (FIG. 21). The PDCL signal goes low at the 79th CP clock period after the SI/ assumes a low logic state thereby providing an enabling signal from the Q output of flip-flop 504 via line 505 to NAND gate 502. So enabled, NAND gate 502 responds to a high logic state INTHRES signal to reset flip-flop 506. The PDCL signal is developed at the output of NOR gate 478. The negated output of NAND gate 476 is coupled to one negated input of NOR gate 478. One input to the NAND gate 476 is coupled to the TC output of binary couner 456 while its other input is coupled to the Q2 output of the binary counter 458. The other negated input of NOR gate 478 receives a low logic state check clear signal designated CKCL output by NAND gate 484 in response to flip-flops 480 and 482 generating a noise-free unambiguous indication that the leading edge of a document has caused a conventional document presence detector to output a check gate leading edge pulse, CKGLECD.

The CKCL signal output from NAND gate 484 (FIG. 20) is also employed to provide a low logic state signal, designated ARCRO/ at the output of NOR gate 526 to reset the reject flip-flop 318 (FIG. 18) and to accept flip-flop 340 upon the leading edge of a document entering the read station as represented by a high logic state CKGLECD check gate leading edge signal setting the flip-flop 480 (FIG. 20) A low logic state ARCRO/ signal is independently output from NOR gate 526 in response to a low logic state SI/ signal appearing on line 511.

While the preferred embodiment of the invention has been described in detail for recognizing symbols in a standard E13-B character font, the peak error detection logic could be readily adapted by a person of ordinary skill in the art to recognize characters or symbols from any standard character font without departing from the spirit of the invention. Furthermore, many other changes in details of the preferred embodiment may be made without departing from the spirit or scope of the invention as defined in the appended claims.

We claim:

1. In a symbol recognition system having means for inducing an analog voltage waveform having spaced apart voltage peaks of varying amplitude corresponding to the configuration of a symbol being recognized, a correlation system including a plurality of outputs each uniquely corresponding to an ideal voltage waveform associated with a symbol in a standard symbol font, the correlation system responsive to the induced voltage peaks for providing a greater correlation output signal on one of said plurality of correlation system outputs relative the remaining correlation system outputs for preliminarily identifying the standard symbol most nearly correlated with the induced analog voltage waveform, and output means responsive to said correlation system plurality of outputs for providing a coded representation of the preliminarily identified standard symbol; wherein the improvement comprises:

means responsive to said inducing means for detecting the absence of a predetermined required peak from said induced analog voltage waveform;

means for comparing said detected absence of a predetermined required peak with a required peak pattern uniquely associated with the ideal voltage waveform for the preliminarily identified standard symbol; and means responsive to said comparing means for disabling said output means and for indicating a reject upon the detected absence of a required peak for the ideal standard voltage waveform associated with the symbol identified by the correlation system.

2. The improvement of claim 1 wherein said required peak absence detecting means comprises:

a dual polarity balanced delay line for receiving said induced analog voltage waveform, said delay line including a plurality of sample tap pairs spacially separated in accordance with the spacing of said spaced apart voltage peaks of said induced analog voltage waveform;

a plurality of absolute value peak detector means individually coupled to said sample tap pairs for providing an absolute value peak signal of said voltage peaks received at predetermined significant ones of said sample tap pairs;

threshold responsive comparator means individually coupled to associated ones of said plurality of absolute value peak detector means for providing a binary valued digital signal for each of said associated absolute value peak signals exceeding a predetermined first voltage threshold level;

required peak error detection logic means individually associated with predetermined ones of said ideal voltage waveforms and responsive to said binary valued digital signals from said comparator means for providing a binary valued peak error signal at a first logic state for each of said predetermined ones of said ideal waveforms upon the coincidence of at least one of said binary valued digital signals provided by said comparator means with its associated ideal waveform.

3. A character recognition system for preventing the misreading of a voltage waveform induced by a magnetically encoded character that may have a predetermined distortion causing the voltage waveform induced therefrom upon relative movement across an electromagnetic transducer reading head to be more nearly correlated with a voltage waveform associated with a standard character of a standard character font other than the voltage waveform associated with a corresponding but non-distorted character, comprising:

analog storage means having an input for receiving the induced voltage waveform from the electromagnetic transducer reading head and a plurality of sample tap outputs corresponding to spacially separated sample points along said induced voltage waveform;

correlation system means including a plurality of input means individually coupled to said plurality of sample taps for determining the closest correlation between the induced voltage waveform and an ideal voltage waveform of a standard font of ideal waveforms corresponding to said standard character font, the correlation system means including a plurality of correlation system output means, an individual correlation system output means associated with each waveform in said standard waveform font, the individual output associated with said closest correlated ideal voltage waveform providing a greater output signal than the other of said correlation system individual outputs;

amplifier means for degeneratively feeding back said greater output signal to said correlation system input means for maximizing said greater output signal relative said other correlative system outputs;

means responsive to said degenerative amplifier feedback means for dynamically establishing two different threshold voltage levels;

extraneous peak detection means responsive to the induced voltage signal at said plurality of sample taps for detecting the presence of an induced voltage signal peak at each of said sample taps exceeding one of said two dynamically established threshold voltage levels;

required peak detection means responsive to the induced voltage signal at said plurality of sample taps for detecting at predetermined ones of said sample taps the absence of an induced voltage signal peak exceeding the other of said two dynamically established threshold voltage levels;

peak error detection logic means responsive to both said extraneous peak detection means and said required peak detection means for providing a plurality of peak error signals individually associated with certain of said standard ideal waveforms having a predetermined statistically significant tendency to be misread, at least one of said plurality of peak error signals providing a possible peak error indication upon either the detection of the presence of an extraneous induced voltage peak by said extraneous peak detection means or the detection of the absence of a required voltage peak by said required peak detection means for said certain individually associated standard ideal waveforms;

pre-character recognition logic means responsive to said plurality of correlation system means outputs for providing a binary coded output identifying said induced voltage waveform preliminarily recognized as corresponding to a particular one ideal waveform of said standard waveform font;

peak error gating logic means for comparing said plurality of peak error signals with said binary coded pre-character recognition logic means output to determine the occurrence of a peak error signal for the particular ideal waveform preliminarily recognized; and means responsive to said comparing means for providing an electrical signal representative of the occurrence of a misread upon the determined occurrence of a peak error signal for the particular ideal waveform preliminarily recognized.

4. The character recognition system of claim 3 wherein said correlation system means further includes a plurality of unique resistive adding network coupled between said correlation system input means and said correlation system output means, each of said plurality of unique resistive adding networks including a plurality of interconnected resistors, each of said resistors having an ohmic value selected in accordance with the actual voltage at predetermined significant ones of said plurality of sample tap outputs.

5. A system for identifying each of a plurality of different waveforms comprising:

analog storage means for serially receiving at least one of said plurality of different waveforms, said analog storage means including a plurality of spaced sample taps for providing a pattern of waveform peak signals as a leading portion of said serially received waveform travels toward a final one of said plurality of sample taps;

correlation means including a plurality of correlation inputs and outputs, said correlation means responsive to said pattern of waveform peak signals for generating a correlation output signal at a unique one of said plurality of correlation outputs for identifying said different waveforms;

feedback means responsive to said correlation outputs for providing a feedback signal to said correlation inputs for maximizing said correlation output signal at said unique one correlation output relative the remaining correlation outputs;

variable threshold responsive first comparator means for comparing said waveform leading portion at one of said sample taps preceding said final sample tap to a predetermined initial variable threshold level;

coarse timing means responsive to said first comparator means for providing a coarse timing signal upon said waveform leading edge at said one sample tap exceeding said predetermined initial threshold;

timing peak detector means responsive to said coarse timing signal for detecting a waveform peak at said one sample tap;

second comparator means for comparing said coarse timing signal with a portion of said waveform arriving at said final sample tap;

first logic means responsive to said first and second comparator means for producing a limited duration sample timing interval upon a detected waveform peak at said one sample tap in coincidence with said portion of said waveform at said final sample tap exceeding said coarse timing signal;

means for detecting a peak on said feedback signal;

means responsive to said detected feedback signal peak for outputting a fine timing pulse only during said limited duration sample timing interval; and means responsive to both said plurality of correlation outputs and said fine timing pulse for providing an output code representative of the waveform identified by said correlation means.

6. The system of claim 5 further comprising:

means coupled to said feedback means for dividing said feedback signal into first and second variable threshold signals;

extraneous peak detection means responsive to the pattern of waveform peak signals at said plurality of spaced sample taps for detecting the presence of an extraneous peak signal at each of said sample taps exceeding said first variable threshold signal;

required peak detection means responsive to said pattern of waveform peak signals at predetermined significant ones of said plurality of sample taps for detecting the absence of a required peak exceeding said second variable threshold;

peak error logic means responsive to both said extraneous peak detection means and said required peak detection means for providing a peak error code representative of the existence of a peak error for various ones of said different waveforms;

preliminary waveform identifying logic means for assigning a preliminary identification code to said waveform identified by said correlation means; and gating means responsive to both said peak error logic means and said preliminary waveform identifying logic means for comparing said peak error code with said preliminary identification code to determine the coincidence of a peak error for the waveform preliminarily identified.

7. The system of claim 6 wherein said first variable threshold signal is greater than said second variable threshold.

8. The system of claim 7 further comprising means responsive to said gating means for disabling said output code providing means upon coincidence of a peak error for the waveform preliminarily identified.

9. The system of claim 5 wherein said timing peak detector means comprises means responsive to said detected waveform peak at said one sample tap for thereafter disabling said first comparator means.

* * * * *